United States Patent
He et al.

(10) Patent No.: US 9,351,356 B2
(45) Date of Patent: May 24, 2016

(54) PRIMARY-SIDE CONTROL OF A SWITCHING POWER CONVERTER WITH FEED FORWARD DELAY COMPENSATION

(75) Inventors: Zhaohui He, Austin, TX (US); Robert T. Grisamore, Austin, TX (US); Michael A. Kost, Cedar Park, TX (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 602 days.

(21) Appl. No.: 13/486,947

(22) Filed: Jun. 1, 2012

(65) Prior Publication Data

US 2012/0306407 A1    Dec. 6, 2012

Related U.S. Application Data

(60) Provisional application No. 61/493,104, filed on Jun. 3, 2011.

(51) Int. Cl.
     *H05B 33/08*      (2006.01)

(52) U.S. Cl.
     CPC ........... *H05B 33/0815* (2013.01); *Y02B 20/346* (2013.01)

(58) Field of Classification Search
     CPC .............. H02M 2001/0009; H02M 2001/0038
     USPC ......... 315/291, 297, 307; 323/282; 363/21.12
     See application file for complete search history.

(56) References Cited

U.S. PATENT DOCUMENTS

| | | |
|---|---|---|
| 3,790,878 A | 2/1974 | Brokaw |
| 4,677,366 A | 6/1987 | Wilkinson et al. |
| 4,683,529 A | 7/1987 | Bucher |
| 4,737,658 A | 4/1988 | Kronmuller et al. |
| 4,937,728 A | 6/1990 | Leonardi |
| 4,940,929 A | 7/1990 | Williams |
| 4,977,366 A | 12/1990 | Powell |

(Continued)

FOREIGN PATENT DOCUMENTS

| | | |
|---|---|---|
| EP | 0536535 A1 | 4/1993 |
| EP | 0636889 | 1/1995 |

(Continued)

OTHER PUBLICATIONS

International Search Report and Written Opinion issued in the corresponding PCT Application No. PCT/US2012/040564 and mailed on Sep. 5, 2012.

(Continued)

*Primary Examiner* — Alexander H Taningco
*Assistant Examiner* — David Lotter (57) ABSTRACT

An electronic system includes controller to control a switching power converter to provide power to a load. To control the amount of power provided to the load, in at least one embodiment, the controller senses a current value representing a current in the switching power converter and detects when the current value reaches a target peak value. However, due to delays in the controller and/or the switching power converter, the detected target peak value will not be the actual current peak value generated by the switching power converter. In at least one embodiment, the controller adjusts the detected target peak value with a post-detection delay compensation factor to generate a delay compensated current value that more accurately represents an actual peak current value associated with the current in the switching power converter.

22 Claims, 8 Drawing Sheets

(56) References Cited

U.S. PATENT DOCUMENTS

| | | |
|---|---|---|
| 5,001,620 A | 3/1991 | Smith |
| 5,003,454 A | 3/1991 | Bruning |
| 5,055,746 A | 10/1991 | Hu et al. |
| 5,109,185 A | 4/1992 | Ball |
| 5,264,780 A | 11/1993 | Bruer et al. |
| 5,278,490 A | 1/1994 | Smedley |
| 5,383,109 A | 1/1995 | Maksimovic et al. |
| 5,424,932 A | 6/1995 | Inou et al. |
| 5,430,635 A | 7/1995 | Liu |
| 5,479,333 A | 12/1995 | McCambridge et al. |
| 5,481,178 A | 1/1996 | Wilcox et al. |
| 5,565,761 A | 10/1996 | Hwang |
| 5,638,265 A | 6/1997 | Gabor |
| 5,691,890 A | 11/1997 | Hyde |
| 5,747,977 A | 5/1998 | Hwang |
| 5,757,635 A | 5/1998 | Seong |
| 5,764,039 A | 6/1998 | Choi et al. |
| 5,783,909 A | 7/1998 | Hochstein |
| 5,798,635 A | 8/1998 | Hwang et al. |
| 5,874,725 A | 2/1999 | Yamaguchi |
| 5,960,207 A | 9/1999 | Brown |
| 5,994,885 A | 11/1999 | Wilcox et al. |
| 6,043,633 A | 3/2000 | Lev et al. |
| 6,084,450 A | 7/2000 | Smith et al. |
| 6,091,233 A | 7/2000 | Hwang et al. |
| 6,160,724 A | 12/2000 | Hemena et al. |
| 6,229,292 B1 | 5/2001 | Redl et al. |
| 6,259,614 B1 | 7/2001 | Ribarich et al. |
| 6,300,723 B1 | 10/2001 | Wang et al. |
| 6,304,066 B1 | 10/2001 | Wilcox et al. |
| 6,304,473 B1 | 10/2001 | Telefus |
| 6,343,026 B1 | 1/2002 | Perry |
| 6,356,040 B1 | 3/2002 | Preis et al. |
| 6,445,600 B2 | 9/2002 | Ben-Yaakov |
| 6,469,484 B2 | 10/2002 | L'Hermite et al. |
| 6,531,854 B2 | 3/2003 | Hwang |
| 6,580,258 B2 | 6/2003 | Wilcox et al. |
| 6,583,550 B2 | 6/2003 | Iwasa |
| 6,621,256 B2 | 9/2003 | Muratov et al. |
| 6,628,106 B1 | 9/2003 | Batarseh et al. |
| 6,657,417 B1 | 12/2003 | Hwang |
| 6,724,174 B1 | 4/2004 | Esteves et al. |
| 6,734,639 B2 | 5/2004 | Chang et al. |
| 6,768,655 B1 | 7/2004 | Yang et al. |
| 6,781,351 B2 | 8/2004 | Mednik et al. |
| 6,839,247 B1 | 1/2005 | Yang |
| 6,882,552 B2 | 4/2005 | Telefus et al. |
| 6,933,706 B2 | 8/2005 | Shih |
| 6,940,733 B2 | 9/2005 | Schie et al. |
| 6,940,933 B1 | 9/2005 | Heinonen et al. |
| 6,944,034 B1 | 9/2005 | Shteynberg et al. |
| 6,956,750 B1 | 10/2005 | Eason et al. |
| 6,975,523 B2 | 12/2005 | Kim et al. |
| 6,980,446 B2 | 12/2005 | Simada et al. |
| 7,072,191 B2 | 7/2006 | Nakao et al. |
| 7,099,163 B1 | 8/2006 | Ying |
| 7,102,902 B1 | 9/2006 | Brown et al. |
| 7,145,295 B1 | 12/2006 | Lee et al. |
| 7,161,816 B2 | 1/2007 | Shteynberg et al. |
| 7,221,130 B2 | 5/2007 | Ribeiro et al. |
| 7,266,001 B1 | 9/2007 | Notohamiprodjo et al. |
| 7,276,861 B1 | 10/2007 | Shteynberg et al. |
| 7,292,013 B1 | 11/2007 | Chen et al. |
| 7,295,452 B1 | 11/2007 | Liu |
| 7,310,244 B2 | 12/2007 | Yang et al. |
| 7,388,764 B2 | 6/2008 | Huynh et al. |
| 7,411,379 B2 | 8/2008 | Chu |
| 7,505,287 B1 | 3/2009 | Kesterson |
| 7,554,473 B2 | 6/2009 | Melanson |
| 7,606,532 B2 | 10/2009 | Wuidart |
| 7,642,762 B2 | 1/2010 | Xie et al. |
| 7,667,986 B2 | 2/2010 | Artusi et al. |
| 7,684,223 B2 | 3/2010 | Wei |
| 7,710,047 B2 | 5/2010 | Shteynberg et al. |
| 7,719,246 B2 | 5/2010 | Melanson |
| 7,719,248 B1 | 5/2010 | Melanson |
| 7,746,043 B2 | 6/2010 | Melanson |
| 7,759,881 B1* | 7/2010 | Melanson .................... 315/307 |
| 7,786,711 B2 | 8/2010 | Wei et al. |
| 7,804,256 B2 | 9/2010 | Melanson |
| 7,804,480 B2 | 9/2010 | Jeon et al. |
| 7,852,017 B1 | 12/2010 | Melanson |
| 7,872,883 B1 | 1/2011 | Elbanhawy |
| 7,880,400 B2 | 2/2011 | Zhou et al. |
| 7,894,216 B2 | 2/2011 | Melanson |
| 8,008,898 B2 | 8/2011 | Melanson et al. |
| 8,115,465 B2 | 2/2012 | Park et al. |
| 8,169,806 B2 | 5/2012 | Sims et al. |
| 8,222,772 B1 | 7/2012 | Vinciarelli |
| 8,222,832 B2 | 7/2012 | Zheng et al. |
| 8,581,504 B2 | 11/2013 | Kost et al. |
| 8,593,075 B1 | 11/2013 | Melanson et al. |
| 8,947,017 B2 | 2/2015 | Kikuchi et al. |
| 2003/0090252 A1 | 5/2003 | Hazucha |
| 2003/0111969 A1 | 6/2003 | Konoshi et al. |
| 2003/0160576 A1 | 8/2003 | Suzuki |
| 2003/0174520 A1 | 9/2003 | Bimbaud |
| 2003/0214821 A1 | 11/2003 | Giannopoulos et al. |
| 2003/0223255 A1 | 12/2003 | Zeltser |
| 2004/0046683 A1 | 3/2004 | Mitamura et al. |
| 2004/0196672 A1 | 10/2004 | Amei |
| 2005/0057237 A1 | 3/2005 | Clavel |
| 2005/0207190 A1 | 9/2005 | Griffer |
| 2005/0231183 A1 | 10/2005 | Li et al. |
| 2005/0270813 A1 | 12/2005 | Zhang et al. |
| 2005/0275354 A1 | 12/2005 | Hausman |
| 2006/0013026 A1 | 1/2006 | Frank et al. |
| 2006/0022648 A1 | 2/2006 | Zeltser |
| 2006/0022916 A1 | 2/2006 | Aiello |
| 2006/0214603 A1 | 9/2006 | Oh |
| 2006/0261754 A1 | 11/2006 | Lee |
| 2006/0285365 A1 | 12/2006 | Huynh |
| 2007/0024213 A1 | 2/2007 | Shteynberg |
| 2007/0103949 A1 | 5/2007 | Tsuruya |
| 2007/0170873 A1 | 7/2007 | Mishima |
| 2007/0182338 A1 | 8/2007 | Shteynberg |
| 2007/0285031 A1 | 12/2007 | Shteynberg |
| 2008/0018261 A1 | 1/2008 | Kastner |
| 2008/0043504 A1 | 2/2008 | Ye |
| 2008/0062584 A1 | 3/2008 | Freitag et al. |
| 2008/0062586 A1 | 3/2008 | Apfel |
| 2008/0117656 A1 | 5/2008 | Clarkin |
| 2008/0130336 A1 | 6/2008 | Taguchi |
| 2008/0174291 A1 | 7/2008 | Hansson |
| 2008/0175029 A1 | 7/2008 | Jung et al. |
| 2008/0224636 A1 | 9/2008 | Melanson |
| 2008/0259655 A1 | 10/2008 | Wei et al. |
| 2008/0278132 A1 | 11/2008 | Kesterson et al. |
| 2008/0310194 A1 | 12/2008 | Huang et al. |
| 2009/0059632 A1 | 3/2009 | Li et al. |
| 2009/0067204 A1 | 3/2009 | Ye et al. |
| 2009/0079357 A1 | 3/2009 | Shteynberg et al. |
| 2009/0108677 A1 | 4/2009 | Walter et al. |
| 2009/0184665 A1 | 7/2009 | Ferro |
| 2009/0284182 A1 | 11/2009 | Cencur |
| 2010/0060200 A1 | 3/2010 | Newman et al. |
| 2010/0066328 A1 | 3/2010 | Shimizu et al. |
| 2010/0128501 A1 | 5/2010 | Huang et al. |
| 2010/0141317 A1 | 6/2010 | Szajnowski |
| 2010/0148681 A1 | 6/2010 | Kuo et al. |
| 2010/0156319 A1 | 6/2010 | Melanson |
| 2010/0213859 A1 | 8/2010 | Shteynberg |
| 2010/0238689 A1 | 9/2010 | Fei et al. |
| 2010/0244726 A1* | 9/2010 | Melanson .................... 315/291 |
| 2011/0110132 A1 | 5/2011 | Rausch |
| 2011/0182089 A1* | 7/2011 | genannt Berghegger .. 363/21.13 |
| 2011/0199793 A1 | 8/2011 | Kuang et al. |
| 2011/0276938 A1 | 11/2011 | Perry et al. |

(56) References Cited

U.S. PATENT DOCUMENTS

| | | |
|---|---|---|
| 2012/0025736 A1 | 2/2012 | Singh et al. |
| 2012/0153858 A1 | 6/2012 | Melanson et al. |
| 2012/0248998 A1 | 10/2012 | Yoshinaga |

FOREIGN PATENT DOCUMENTS

| | | |
|---|---|---|
| EP | 0636889 A1 | 1/1995 |
| EP | 1213823 A2 | 6/2002 |
| EP | 1289107 A3 | 5/2003 |
| EP | 1962263 A1 | 8/2008 |
| EP | 2232949 | 9/2010 |
| JP | 2008053181 A | 3/2006 |
| WO | 2004/051834 A1 | 6/2004 |
| WO | 2004051834 A1 | 6/2004 |
| WO | 2006013557 A1 | 2/2006 |
| WO | 2006/022107 A1 | 3/2006 |
| WO | 2007016373 A3 | 2/2007 |
| WO | 2008/004008 A2 | 1/2008 |
| WO | 2008004008 A2 | 1/2008 |
| WO | 2008152838 A2 | 12/2008 |
| WO | 2010065598 | 10/2010 |

OTHER PUBLICATIONS

Rensas, Renesas Technology Releases Industry's First Critical-Conduction-Mode Power Factor Correction Control IC Implementing Interleaved Operations, R2A20112, Dec. 18, 2006, pp. 1-4, Tokyo, Japan.
Renesas, PFC Control IC R2A20111 Evaluation Board, Application Note R2A20111 EVB, Feb. 2007, Rev. 1.0, pp. 1-40, Tokyo, Japan.
Renesas, Power Factor Correction Controller IC, HA16174P/FP, Rev. 1.0, Jan. 6, 2006, pp. 1-38, Tokyo, Japan.
STMicroelectronics, Transition Mode PFC Controller, Datasheet L6562, Rev. 8, Nov. 2005, pp. 1-16, Geneva, Switzerland.
STMicroelectronics, Electronic Ballast with PFC Using L6574 and L6561, Application Note AN993, May 2004, pp. 1-20, Geneva, Switzerland.
STMicroelectronics, Advanced Transition-Mode PFC Controller L6563 and L6563A, Mar. 2007, pp. 1-40, Geneva, Switzerland.
STMicroelectronics, CFL/TL Ballast Driver Preheat and Dimming L6574, Sep. 2003, pp. 1-10, Geneva, Switzerland.
STMicroelectronics, Power Factor Connector L6561, Rev 16, Jun. 2004, pp. 1-13, Geneva, Switzerland.
Texas Instruments, Avoiding Audible Noise at Light Loads When Using Leading Edge Triggered PFC Converters, Application Report SLUA309A, Mar. 2004—Revised Sep. 2004, pp. 1-4, Dallas, Texas, USA.
Texas Instruments, Startup Current Transient of the Leading Edge Triggered PFC Controllers, Application Report SLUA321, Jul. 2004, pp. 1-4, Dallas, Texas, USA.
Texas Instruments, Current Sense Transformer Evaluation UCC3817, Application Report SLUA308, Feb. 2004, pp. 1-3, Dallas, Texas, USA.
Texas Instruments, 350-W Two-Phase Interleaved PFC Pre-regulator Design Review, Application Report SLUA369B, Feb. 2005—Revised Mar. 2007, pp. 1-22, Dallas, Texas, USA.
Texas Instruments, Average Current Mode Controlled Power Factor Correction Converter using TMS320LF2407A, Application Report SPRA902A, Jul. 2005, pp. 1-15, Dallas, Texas, USA.
Texas Instruments, Transition Mode PFC Controller, UCC28050, UCC28051, UCC38050, UCC38051, Application Note SLUS515D, Sep. 2002—Revised Jul. 2005, pp. 1-28, Dallas, Texas, USA.
Texas Instruments, Interleaving Continuous Conduction Mode PFC Controller, UCC28070, SLUS794C, Nov. 2007—Revised Jun. 2009, pp. 1-45, Dallas, Texas, USA.
Texas Instruments, BiCMOS Power Factor Preregulator Evaluation Board UCC3817, User's Guide, SLUU077C, Sep. 2000—Revised Nov. 2002, pp. 1-10, Dallas, Texas, USA.
ON Semiconductor Four Key Steps to Design a Continuous Conduction Mode PFC Stage Using the NCP1653, Application Note AND8184/D, Nov. 2004, pp. 1-8, Phoenix, AZ, USA.
Unitrode, BiCMOS Power Factor Preregulator, Texas Instruments, UCC2817, UCC2818, UCC3817, UCC3818, SLUS3951, Feb. 2000—Revised Feb. 2006, pp. 1-25, Dallas, Texas, USA.
Unitrode, Optimizing Performance in UC3854 Power Factor Correction Applications, Design Note DN 39E, 1999, pp. 1-6, Merrimack, Maine, USA.
Unitrode, High Power-Factor Preregulator, UC1852, UC2852, UC3852, Feb. 5, 2007, pp. 1-8, Merrimack, Maine, USA.
Unitrode, UC3854A/B and UC3855A/B Provide Power Limiting with Sinusoidal Input Current for PFC Front Ends, SLUA196A, Design Note DN-66, Jun. 1995—Revised Nov. 2001, pp. 1-6, Merrimack, Maine, USA.
Unitrode, Programmable Output Power Factor Preregulator, UCC2819, UCC3819, SLUS482B, Apr. 2001—Revised Dec. 2004, pp. 1-16, Merrimack, Maine, USA.
Texas Instruments, UCC281019, 8-Pin Continuous Conduction Mode (CCM) PFC Controller, SLU828B, Revised Apr. 2009, pp. 1-48, Dallas, Texas, USA.
http://toolbarpdf.com/docs/functions-and-features-of=inverters.html, Jan. 20, 2011, pp. 1-8.
Mammano, Bob, Current Sensing Solutions for Power Supply Designers, Texas Instruments, 2001, pp. 1-36, Dallas, Texas, USA.
Maksimovic, et al, Impact of Digital Control in Power Electronics, International Symposium on Power Semiconductor Devices and ICS, 2004, pp. 2-22, Boulder, Colorado, USA.
Garcia, O., et al, High Efficiency PFC Converter to Meet EN610000302 and A14, Industrial Electronics, 2002. ISIE 2002. Proceedings of the 2002 IEEE International Symposium, vol. 3, pp. 975-980, Div. de Ingenieria Electronica, Univ. Politecnica de Madrid, Spain.
Infineon Technologies AG, Standalone Power Factor Correction (PFC) Controller in Continuous Conduction Mode (CCM), Infineon Power Management and Supply, CCM-PFC, ICE2PCS01, ICE2PCS01G, Version 2.1, Feb. 6, 2007, p. 1-22, Munchen, Germany.
Lu, et al, Bridgeless PFC Implementation Using One Cycle Control Technique, International Rectifier, 2005, pp. 1-6, Blacksburg, VA, USA.
Brown, et al, PFC Converter Design with IR1150 One Cycle Control IC, International Rectifier, Application Note AN-1077, pp. 1-18, El Segundo CA, USA.
International Rectifer, PFC One Cycle Control PFC IC, International Rectifier, Data Sheet No. PD60230 rev. C, IR1150(S)(PbF), IR11501(S)(PbF), Feb. 5, 2007, pp. 1-16, El Segundo, CA, USA.
International Rectifier, IRAC1150=300W Demo Board, User's Guide, Rev 3.0, International Rectifier Computing and Communications SBU—AC-DC Application Group, pp. 1-18, Aug. 2, 2005, El Segundo, CO USA
Lai, Z., et al, A Family of Power-Factor-Correction Controllerr, Applied Power Electronics Conference and Exposition, 1997. APEC '97 Conference Proceedings 1997., Twelfth Annual, vol. 1, pp. 66-73, Feb. 23-27, 1997, Irvine, CA.
Lee, P, et al, Steady-State Analysis of an Interleaved Boost Converter with Coupled Inductors, IEEE Transactions on Industrial Electronics, vol. 47, No. 4, Aug. 2000, pp. 787-795, Hung Hom, Kowloon, Hong Kong.
Linear Technology, Single Switch PWM Controller with Auxiliary Boost Converter, Linear Technology Corporation, Data Sheet LT1950, pp. 1-20, Milpitas, CA, USA.
Linear Technology, Power Factor Controller, Linear Technology Corporation, Data Sheet LT1248, pp. 1-12, Milpitas, CA, USA.
Supertex, Inc., HV9931 Unity Power Factor LED Lamp Driver, Supertex, Inc., Application Note AN-H52, 2007, pp. 1-20, Sunnyvale, CA, USA.
Ben-Yaakov, et al, The Dynamics of a PWM Boost Converter with Resistive Input, IEEE Transactions on Industrial Electronics, vol. 46., No. 3, Jun. 1999, pp. 1-8, Negev, Beer-Sheva, Israel.
Erickson, Robert W., et al, Fundamentals of Power Electronics, Second Edition, Chapter 6, 2001, pp. 131-184, Boulder CO, USA.
STMicroelectronics, CFL/TL Ballast Driver Preheat and Dimming L6574, Sep. 2003, Geneva, Switzerland.

(56) References Cited

OTHER PUBLICATIONS

Fairchild Semiconductor, 500W Power-Factor-Corrected (PFC) Converter Design with FAN4810, Application Note 6004, Rev. 1.0.1, Oct. 31, 2003, San Jose, CA, USA.

Fairfield Semiconductor, Power Factor Correction (PFC) Basics, Application Note 42047, Rev. 0.9.0, Aug. 19, 2004, San Jose, CA, USA.

Fairchild Semiconductor, Design of Power Factor Correction Circuit Using FAN7527B, Application Note AN4121, Rev. 1.0.1, May 30, 2002, San Jose, CA, USA.

Fairchild Semiconductor, Low Start-Up Current PFC/PWM Controller Combos FAN4800, Rev. 1.0.6, Nov. 2006, San Jose, CA, USA.

Prodic, Aleksander, Compensator Design and Stability Assessment for Fast Voltage Loops of Power Factor Correction Rectifiers, IEEE Transactions on Power Electronics, vol. 22, Issue 5, Sep. 2007, pp. 1719-1730, Toronto, Canada.

Fairchild Semiconductor, ZVS Average Current PFC Controller FAN 4822, Rev. 1.0.1, Aug. 10, 2001, San Jose, CA, USA.

Prodic, et al, Dead-Zone Digital Controller for Improved Dynamic Response of Power Factor Preregulators, Applied Power Electronics Conference and Exposition, 2003, vol. 1, pp. 382-388, Boulder CA, USA.

Philips Semiconductors, 90W Resonant SMPS with TEA1610 Swing Chip, Application Note AN99011, Sep. 14, 1999, The Netherlands.

STMicroelectronics, Advanced Transition-Mode PFC Controller L6563 and L6563A, Mar. 2007, Geneva, Switzerland.

ON Semiconductor, Power Factor Controller for Compact and Robust, Continuous Conduction Mode Pre-Converters, NCP1654, Mar. 2007, Rev. PO, Denver, CO, USA.

Fairchild Semicondctor, Simple Ballast Controller, KA7541, Rev. 1.0.3, Sep. 27, 2001, San Jose, CA, USA.

Fairchild Semiconductor, Power Factor Controller, ML4812, Rev. 1.0.4, May 31, 2001, San Jose, CA, USA.

Prodic, et al, Digital Controller for High-Frequency Rectifiers with Power Factor Correction Suitable for On-Chip Implementation, Power Conversion Conference—Nagoya, 2007. PCC '07, Apr. 2-5, 2007, pp. 1527-1531, Toronto, Canada.

Freescale Semiconductor, Dimmable Light Ballast with Power Factor Correction, Designer Reference Manual, DRM067, Rev. 1, Dec. 2005, M68HC08 Microcontrollers, Chandler, AZ, USA.

Freescale Semiconductor, Design of Indirect Power Factor Correction Using 56F800/E, Freescale Semiconductor Application Note, AN1965, Rev. 1, Jul. 2005, Chandler, AZ, USA.

Freescale Semiconductor, Implementing PFC Average Current Mode Control using the MC9S12E128, Application Note AN3052, Addendum to Reference Design Manual DRM064, Rev. 0, Nov. 2005, Chandler, AZ, USA.

Hirota, et al, Analysis of Single Switch Delta-Sigma Modulated Pulse Space Modulation PFC Converter Effectively Using Switching Power Device, Power Electronics Specialists Conference, 2002. pesc Feb. 2002 IEEE 33rd Annual, vol. 2, pp. 682-686, Hyogo Japan.

Madigan, et al, Integrated High-Quality Rectifier-Regulators, Industrial Electronics, IEEE Transactions, vol. 46, Issue 4, pp. 749-758, Aug. 1999, Cary, NC, USA.

Renesas, Renesas Technology Releases Industry's First Critical-Conduction-Mode Power Factor Correction Control IC Implementing Interleaved Operations, R2A20112, all pages, Dec. 18, 2006, Tokyo, Japan.

Renesas, PFC Control IC R2A20111 Evaluation Board, Application Note R2A20111 EVB, all pages, Feb. 2007, Rev. 1.0, Tokyo, Japan.

Miwa, et al, High Efficiency Power Factor Correction Using Interleaving Techniques, Applied Power Electronics Conference and Exposition, 1992. APEC '92. Conference Proceedings 1992., Seventh Annual, Feb. 23-27, 1992, pp. 557-568, MIT, Cambridge, MA, USA.

Noon, Jim, High Performance Power Factor Preregulator UC3855A/B, Texas Instruments Application Report, SLUA146A, May 1996—Revised Apr. 2004, Dallas TX, USA.

NXP Semiconductors, TEA1750, GreenChip III SMPS Control IC Product Data Sheet, Rev.01, Apr. 6, 2007, Eindhoven, The Netherlands.

Turchi, Joel, Power Factor Correction Stages Operating in Critical Conduction Mode, ON Semiconductor, Application Note AND8123/D, Sep. 2003—Rev. 1 , Denver, CO, USA.

ON Semiconductor, GreenLLine Compact Power Factor Controller: Innovative Circuit for Cost Effective Solutions, MC33260, Semiconductor Components Industries, Sep. 2005—Rev. 9, Denver, CO, USA.

ON Semiconductor, Enhanced, High Voltage and Efficient Standby Mode, Power Factor Controller, NCP1605, Feb. 2007, Rev. 1, Denver, CO, USA.

ON Semiconductor, Cost Effective Power Factor Controller, NCP1606, Mar. 2007, Rev. 3, Denver, CO, USA.

Renesas, Power Factor Correction Controller IC, HA16174P/FP, Rev. 1.0, Jan. 6, 2006, Tokyo, Japan.

Seidel, et al, A Practical Comparison Among High-Power-Factor Electronic Ballasts with Similar Ideas, IEEE Transactions on Industry Applications, vol. 41, No. 6, Nov./Dec. 2005, pp. 1574-1583, Santa Maria, Brazil.

STMicroelectronics, Electronic Ballast with PFC using L6574 and L6561, Application Note AN993, May 2004, pp. 1-10, Geneva, Switzerland.

Brkovic, Milivoje, Automatic Current Shaper with Fast Output Regulation and Soft-Switching, Telecommunications Energy Conference, INTELEC '93. 15th International, Sep. 27-30, 1993, pp. 379-386, vol. 1, California Institute Technology, Pasadena, California USA.

Dilouie, Craig, Introducing the LED Driver, Electrical Construction & Maintenance (EC&M), Sep. 1, 2004, ,pp. 28-32, Zing Communications, Inc., Calgary, Alberda, Canada.

Spiazzi, Giorgio, Simone Buso and Gaudenzio Meneghesso, Analysis of a High-Power-Factor Electronic Ballast for High Brightness Light Emitting Diode, Power Electronics Specialist Conference, 2005. PESC '05, IEEE 36th, pp. 1494-1499, 2005, Dept. of Information Engineering, University of Padova, Padova, Italy.

Supertex Inc, 56W Off-line LED Driver, 120VAC with PFC, 160V, 350mA Load, Dimmer Switch Compatible, DN-H05, pp. 1-20, Jun. 17, 2008, Sunnyvale, California, USA.

Yao, et al, Soft Switching Circuit for Interleaved Boost Converters, IEEE Transactions on Power Electronics, vol. 22, No. 1, Jan. 2007, pp. 80-86, Zhejiang Univ., Hangzhou.

Zhang, et al, A New Duty Cycle Control Strategy for Power Factor Correction and FPGA Implementation, IEEE Transactions on Power Electronics, vol. 21, No. 6, Nov. 2006, pp. 1745-1753, Ontario, Canada.

Zhou, et al, Novel Sampling Algorithm for DSP Controlled 2kW PFC Converter, IEEE Transactions on Power Electronics, vol. 16, No. 2, Mar. 2001, pp. 217-222, Zhejiang Univ., Hangzhou.

Unitrode, Programmable Output Power Factor Preregulator, UCC2819, UCC3819, SLUS482B, Apr. 2001—Revised Dec. 2004, pp. 1-16, Merrimack, ME, USA.

Unitrode, UC3854A/B and UC3855A/B Provide Power Limiting with Sinusoidal Input Current for PFC Front Ends, SLUA196A, Design Note DN-66, Jun. 1995—Revised Nov. 2001, pp. 1-6, Merrimack, ME, USA.

Unitrode, High Power-Factor Preregulator, UC1852, UC2852, UC3852, Feb. 5, 2007, pp. 1-8, Merrimack, ME, USA.

Unitrode, Optimizing Performance in UC 3854 Power Factor Correction Applications, Design Note DDN-39E, 1999, pp. 1-6, Merrimack, ME, USA.

STMicroelectronics, Power Factor Corrector, L6561, Rev. 16, Jun. 2004, pp. 1-13, Geneva, Switzerland.

Texas Instruments, Avoiding Audible Noise at Light Loads When Using Leading Edge Triggered PFC Converters, Application Report SLUA309A, Mar. 2004—Revised Sep. 2004, pp. 1-4, Dallas, TX, USA.

Texas Instruments, Startup Current Transient of the Leading Edge Triggered PFC Controllers, Application Report SLUA321, Jul. 2004, pp. 1-4, Dallas, TX, USA.

Texas Instruments, Current Sense Transformer Evaluation UCC3817, Application Report SLUA308, Feb. 2004, pp. 1-3, Dallas, TX, USA.

(56) References Cited

OTHER PUBLICATIONS

Texas Instruments, 350-W, Two-Phase Interleaved PFC Pre-regulator Design Review, Application Report SLUA369B, Feb. 2005—Revised Mar. 2007, pp. 1-22, Dallas, TX, USA.
Texas Instruments, Average Current Mode Controlled Power Factor Correction Converter using TMS320LF2407A, Application Report SPRA902A, Jul. 2005, pp. 1-15, Dallas, TX, USA.
Texas Instruments, Transition Mode PFC Controller, UCC28050, UCC28051, UCC38050, UCC38051, Application Note SLUS5150, Sep. 2002—Revised Jul. 2005, pp. 1-28, Dallas TX, USA.
Texas Instruments, Interleaving Continuous Conduction Mode PFC Controller, UCC28070, SLUS794C, Nov. 2007—Revised Jun. 2009, pp. 1-45, Dallas, TX, USA.
Texas Instruments, BiCMOS Power Factor Prerefulator Evaluation Board UCC3817, User's Guide, SLUU077C, Sep. 2000—Revised Nov. 2002, pp. 1-10, Dallas, TX, USA.
ON Semiconductor, Four Key Steps to Design a Continuous Conduction Mode PFC Stage Using the NCP1653, Application Note AND8184/D, Nov. 2004, pp. 1-8, Phoenix, AZ, USA.
Unitrode, BiCMOS Power Factor Preregulator, Texas Instruments, UCC2817, UCC2818, UCC3817, UCC3818, SLUS3951, Feb. 2000—Revised Feb. 2006, pp. 1-25, Dallas, TX, USA.
Texas Instruments, High Performance Power Factor Preregulator, UC2855A/B and UC3855A/B, SLUS328B, Jun. 1998, Revised Oct. 2005, pp. 1-14, Dallas, TX, USA.
Balogh, Laszlo, et al,Power-Factor Correction with Interleaved Boost Converters in Continuous-Inductr-Current Mode, 1993, IEEE, pp. 168-174, Switzerland.
Cheng, Hung L., et al, A Novel Single-Stage High-Power-Factor Electronic Ballast with Symmetrical Topology, Power Electronics and Motion Control Conference, 2006. IPEMC 2006. CES/IEEE 5th International, Aug. 14-16, 2006, vol. 50, No. 4, Aug. 2003, pp. 759-766, Nat. Ilan Univ., Taiwan.
Fairchild Semiconductor, Theory and Application of the ML4821 Average Current Mode PFC Controllerr, Fairchild Semiconductor Application Note 42030, Rev. 1.0, Oct. 25, 2000, pp. 1-19, San Jose, California, USA.
Brown, et al, PFC Converter Design with IR1150 One Cycle Control IC, International Rectifier, Application Note AN-1077, Revision 2.3, Jun. 2005, pp. 1-18, El Segundo CA, USA.
International Rectifier, IRAC1150-300W Demo Board, User's Guide, Rev 3.0, International Rectifier Computing and Communications SBU—AC-DC Application Group, pp. 1-18, Aug. 2, 2005, El Segundo, CO USA.
Linear Technology, Single Switch PWM Controller with Auxiliary Boost Converter, Linear Technology Corporation, Data Sheet LT1950, Rev. A., pp. 1-20, May 14, 2004, Milpitas, CA, USA.
Linear Technology, Power Factor Controller, Linear Technology Corporation, Data Sheet LT1248, Rev. D, pp. 1-12, 1993, Milpitas, CA, USA.
STMicroelectronics, CFL/TL Ballast Driver Preheat and Dimming L6574, pp. 1-10, Sep. 2003, Geneva, Switzerland.
Fairchild Semiconductor, 500W Power-Factor-Corrected (PFC) Converter Design with FAN4810, Application Note 6004, Rev. 1.0.1, pp. 1-14, Oct. 31, 2003, San Jose, CA, USA.
Fairfield Semiconductor, Power Factor Correction (PFC) Basics, Application Note 42047, Rev. 0.9.0, pp. 1-11, Aug. 19, 2004, San Jose, CA, USA.
Fairchild Semiconductor, Design of Power Factor Correction Circuit Using FAN7527B, Application Note AN4121, Rev. 1.0.1, pp. 1-22, May 30, 2002, San Jose, CA, USA.
Fairchild Semiconductor, Low Start-Up Current PFC/PWM Controller Combos FAN4800, Rev. 1.0.6, pp. 1-20, Nov. 2006, San Jose, CA, USA.
Fairchild Semiconductor, ZVS Average Current PFC Controller FAN 4822, Rev. 1.0.1, pp. 1-10, Aug. 10, 2001, San Jose, CA, USA.
Philips Semiconductors, 90W Resonant SMPS with TEA1610 Swing Chip, Application Note AN99011, pp. 1-27, Sep. 14, 1999, The Netherlands.
Fairchild Semiconductor, Power Factor Correction Controller FAN7527B, pp. 1-12, Aug. 16, 2003, San Jose, CA, USA.
ON Semiconductor, Power Factor Controller for Compact and Robust, Continuous Conduction Mode Pre-Converters, NCP1654, pp. 1-10, Mar. 2007, Rev. PO, Denver, CO, USA.
Fairchild Semicondctor, Simple Ballast Controller, KA7541, Rev. 1.0.3, pp. 1-14, Sep. 27, 2001, San Jose, CA, USA.
Fairchild Semiconductor, Power Factor Controller, ML4812, Rev. 1.0.4, pp. 1-18, May 31, 2001, San Jose, CA, USA.
Freescale Semiconductor, Dimmable Light Ballast with Power Factor Correction, Designer Reference Manual, DRM067, Rev. 1, pp. 1-72, Dec. 2005, M68HC08 Microcontrollers, Chandler, AZ, USA.
Freescale Semiconductor, Design of Indirect Power Factor Correction Using 56F800/E, Freescale Semiconductor Application Note, AN1965, Rev. 1, pp. 1-20, Jul. 2005, Chandler, AZ, USA.
Freescale Semiconductor, Implementing PFC Average Current Mode Control using the MC9S12E128, Application Note AN3052, Addendum to Reference Design Manual DRM064, Rev. 0, pp. 1-8, Nov. 2005, Chandler, AZ, USA.
Renesas, Renesas Technology Releases Industry's First Critical-Conduction-Mode Power Factor Correction Control IC Implementing Interleaved Operations, R2A20112, pp. 1-4, Dec. 18, 2006, Tokyo, Japan.
Renesas, PFC Control IC R2A20111 Evaluation Board, Application Note R2A20111 EVB, pp. 1-40, Feb. 2007, Rev. 1.0, Tokyo, Japan.
Noon, Jim, High Performance Power Factor Preregulator UC3855A/B, Texas Instruments Application Report, SLUA146A, pp. 1-35, May 1996—Revised Apr. 2004, Dallas TX, USA.
NXP Semiconductors, TEA1750, GreenChip III SMPS Control IC Product Data Sheet, Rev.01, pp. 1-30, Apr. 6, 2007, Eindhoven, The Netherlands.
Turchi, Joel, Power Factor Correction Stages Operating in Critical Conduction Mode, ON Semiconductor, Application Note AND8123/D, pp. 1-20, Sep. 2003—Rev. 1 , Denver, CO, USA.
ON Semiconductor, GreenLLine Compact Power Factor Controller: Innovative Circuit for Cost Effective Solutions, MC33260, Semiconductor Components Industries, pp. 1-22, Sep. 2005—Rev. 9, Denver, CO, USA.
ON Semiconductor, Enhanced, High Voltage and Efficient Standby Mode, Power Factor Controller, NCP1605, pp. 1-32, Feb. 2007, Rev. 1, Denver, CO, USA.
ON Semiconductor, Cost Effective Power Factor Controller, NCP1606, pp. 1-22, Mar. 2007, Rev. 3, Denver, CO, USA.
Renesas, Power Factor Correction Controller IC, HA16174P/FP, Rev. 1.0, pp. 1-36, Jan. 6, 2006, Tokyo, Japan.
STMicroelectronics, Advanced Transition-Mode PFC Controller L6563 and L6563A, pp. 1-39, Mar. 2007, Geneva, Switzerland.
Response to the Written Opinion as filed Jul. 30, 2014, Application No. 12731217.1, European Patent Office, pp. 1-12.
First Office Action dated Sep. 6, 2015, mailed in Chinese Application No. 2012800269591, pp. 1-5, The State Intellectual Property Office of the People's Republic of China.
Search Report dated Aug. 24, 2015, mailed in Chinese Application No. 2012800269591, pp. 1-2, The State Intellectual Property Office of the People's Republic of China.

\* cited by examiner

PRIMARY-SIDE CONTROL OF A SWITCHING POWER CONVERTER WITH FEED FORWARD DELAY COMPENSATION

CROSS-REFERENCE TO RELATED APPLICATION

This application claims the benefit under 35 U.S.C. §119 (e) and 37 C.F.R. §1.78 of U.S. Provisional Application No. 61/493,104, filed Jun. 3, 2011, and entitled "Peak Current Compensation for Better Line Regulation," which is incorporated by reference in its entirety.

BACKGROUND OF THE INVENTION

1. Field of the Invention

The present invention relates in general to the field of electronics, and more specifically to a method and system for exercising primary-side control of a switching power converter with feed-forward delay compensation.

2. Description of the Related Art

Many electronic systems utilize switching power converters to efficiently convert power from one source into power useable by a device (referred to herein as a "load"). For example, power companies often provide alternating current (AC) power at specific voltages within a specific frequency range. However, many loads utilize power at a different voltage and/or frequency than the supplied power. For example, some loads, such as light emitting diode (LED) based lamps operate from a direct current (DC). "DC current" is also referred to as "constant current". "Constant" current does not mean that the current cannot change over time. The DC value of the constant current can change to another DC value. Additionally, a constant current may have noise or other minor fluctuations that cause the DC value of the current to fluctuate. "Constant current devices" have a steady state output that depends upon the DC value of the current supplied to the devices.

LEDs are becoming particularly attractive as main stream light sources in part because of energy savings through high efficiency light output, long life, and environmental incentives such as the reduction of mercury. LEDs are semiconductor devices and are best driven by direct current. The brightness of the LED varies in direct proportion to the DC current supplied to the LED. Thus, increasing current supplied to an LED increases the brightness of the LED and decreasing current supplied to the LED dims the LED.

Figure 1:
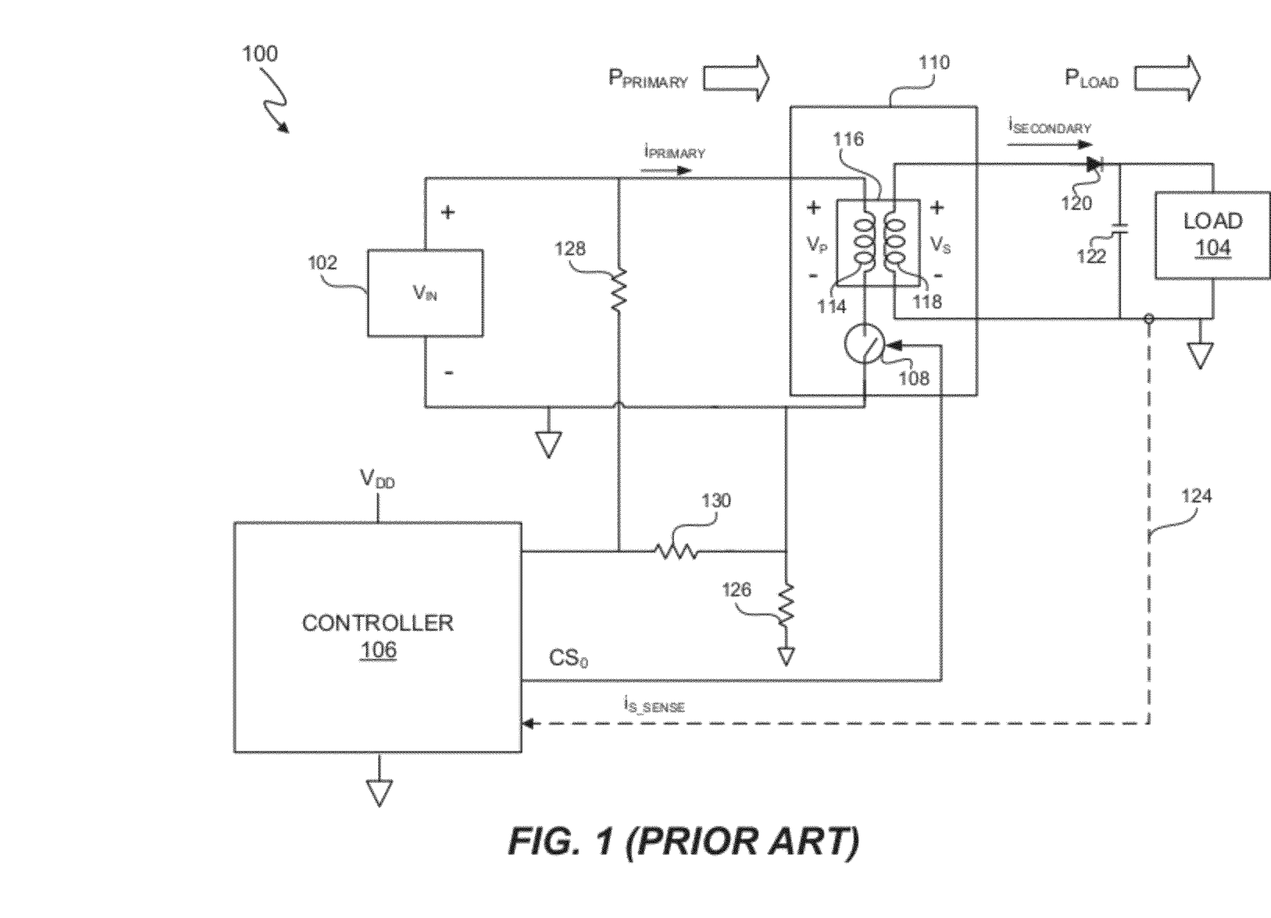
FIG. 1 (labeled prior art) depicts an electronic system.

FIG. 1 depicts an electronic system 100 that converts power from voltage source 102 into power usable by load 104. Load 104 is a constant current load that includes, for example, one or more LEDs. A controller 106 controls the power conversion process. Voltage source 102 can be any type of voltage source such as a public utility supplying a 60 Hz/110 V input voltage $V_{IN}$ or a 50 Hz/220 V input voltage $V_{IN}$ in Europe or the People's Republic of China, or a DC voltage source supplied by a battery or another switching power converter.

The controller 106 provides a pulse width modulated (PWM) control signal $CS_0$ to current control switch 108 in a flyback-type, switching power converter 110 to control the conversion of input voltage $V_{IN}$ into a primary-side voltage $V_P$ and secondary voltage $V_S$. The switch 108 is, for example, a field effect transistor (FET). When control signal $CS_0$ causes switch 108 to conduct, a primary-side current $i_{PRIMARY}$ flows into a primary coil 114 of transformer 116 to energize the primary coil 114. When control signal $CS_0$ opens switch 112, primary coil 114 deenergizes. Energizing and deenergizing the primary coil 114 induces a secondary voltage $V_S$ across a secondary coil 118 of transformer 116. Primary voltage $V_P$ is N times the secondary voltage $V_S$, i.e. $V_P = N \cdot V_S$, and "N" is a ratio of coil turns in the primary coil 114 to the coil turns in the secondary coil 118. The secondary-side current $i_{SECONDARY}$ is a direct function of the secondary voltage $V_S$ and the impedance of diode 120, capacitor 122, and load 104. Diode 120 allows the secondary-side current $i_{SECONDARY}$ to flow in one direction. The secondary-side current $i_{SECONDARY}$ charges capacitor 120, and capacitor 120 maintains an approximately DC voltage $V_{LOAD}$ across load 104. Thus, secondary-side current $i_{SECONDARY}$ is a DC current.

The load 104 has a certain power demand, and the controller 106 generates the switch signal $CS_0$ in an attempt to cause the switching power converter 110 to meet the power demand of the load 104. Ideally, the power $P_{PRIMARY}$ provided by the primary-side of the switching power converter 110 equals the power $P_{LOAD}$ that is provided to the load 104. However, power losses due to non-idealities in the electronic system 100 result in the power $P_{PRIMARY}$ provided by the primary-side being greater than the power $P_{LOAD}$ delivered to the load 104, i.e. $P_{PRIMARY} > P_{LOAD}$. To meet the power demand of the load 104, controller 106 utilizes feedback to determine the amount of power actually delivered to the load 104. The controller 106 attempts to generate the control signal $CS_0$ to control the primary-side current $i_{PRIMARY}$ so that the power $P_{PRIMARY}$ meets the power demand of the load 104.

Controller 106 utilizes a feedback control loop to control the power $P_{LOAD}$ delivered to the load 104. To control the power $P_{LOAD}$, the controller 106 controls the control signal $CS_0$ and thereby controls the primary-side current $i_{PRIMARY}$. Controlling the primary-side current $i_{PRIMARY}$ controls the primary-side power $P_{PRIMARY}$ provided by the primary-side of the switching power converter 110. The controller 106 adjusts the primary-side current $i_{PRIMARY}$ so that the primary-side power $P_{PRIMARY}$ is sufficient to transfer enough power $P_{LOAD}$ to the load 104 to meet the power demand of the load 104.

To generate the primary-side power $P_{PRIMARY}$, controller 106 utilizes either secondary-side, feedback-based control via a secondary-side feedback path 124 or primary-side control via sense resistor 126. The secondary-side, feedback path 124 is shown with a 'dashed' line to indicate use in the alternative to primary-side feedback. For secondary-side, feedback-based control, the controller 106 senses the secondary current $i_{SECONDARY}$ via the signal $i_{S\_SENSE}$. The secondary-side feedback path 124 generally includes components, such as an opto-isolator or optocoupler, that provide electrical isolation between the controller 106 and the secondary-side of the transformer 110. Since the controller 106 knows the primary-side voltage $V_P$ and the turns ratio N, the controller 106 also knows the secondary side voltage $V_S$ and knows the secondary-side current $i_{SECONDARY}$ from the feedback signal $i_{S\_SENSE}$. Thus, the controller 106 can directly determine the power $P_{LOAD}$ delivered to the load 104. The controller 106 generates the control signal $CS_0$ to generate the primary-side current $i_{PRIMARY}$ to meet the power demand of the load 104 so that the power demand of the load equals the power provided to the load 104.

The actual peak value of the primary-side current $i_{PRIMARY}$ is directly proportional to the amount of power delivered to the load 104. Thus, for primary-side only control, determination of the actual peak value $i_{PK}$ of the primary-side current $i_{PRIMARY}$ dominates the accuracy of the determination of the amount of power delivered to the load 104. The foregoing statement is especially the case during low power applications since the range of the primary-side current $i_{PRIMARY}$ is reduced. The switch 108 does not turn OFF instantaneously upon detection of a target peak value $i_{PK}$ of the primary-side current $i_{PRIMARY}$ by the controller 106. Once the controller 106 senses that the primary-side peak current $i_{PK\_SENSE}$ equals a target peak value $i_{PK}$ and turns switch 108 OFF, the actual primary-side current $i_{PRIMARY}$ has already overshot the sensed peak current $i_{PK\_SENSE}$.

To compensate for the delay in turning switch 108 OFF, the electronic system 100 introduces a feed forward, scaled voltage compensation factor $$\frac{V_{IN}}{R_{SENSE}} \times \frac{R_{130}}{R_{128} + R_{130}}$$

to boost the current conducted by the sense resistor 126. $R_{SENSE}$ is the resistance value of the sense resistor 126, $R_{128}$ is the resistance value of the resistor 128, $R_{130}$ is the resistance value of the resistor 130. Boosting the current across the sense resistor 126 prior to the controller 106 sensing the primary-side current causes the controller 106 to determine a higher peak current $i_{PK\_SENSE}$ that can compensate for the delay in turning off the switch 108. Equation [1] represents the value of the estimated peak current $i_{PK\_EST}$ using the fixed, feed forward compensation factor:

$$i_{PK\_EST} = i_{PK\_SENSE} + \frac{V_{IN}}{R_{SENSE}} \times \frac{R_{130}}{R_{128} + R_{130}} = i_{PK} + \frac{V_{IN}}{L} \times t_{DELAY}; \quad [1]$$

and $$t_{DELAY} = \frac{L}{R_{SENSE}} \times \frac{R_{130}}{R_{128} + R_{130}}. \quad [2]$$

$i_{PK\_EST}$ is the estimated peak value of the primary current $i_{PRIMARY}$, and $i_{PK\_SENSE}$ is the sensed peak value of the primary-side current. As previously stated, $R_{SENSE}$ is the resistance value of the sense resistor 126, $R_{128}$ is the resistance value of the resistor 128, $R_{130}$ is the resistance value of the resistor 130, L is the inductance value of the primary-side coil 114, and $t_{DELAY}$, as defined by Equation [2], is the delay due to the switch 108 OFF. Since the compensation factor $$\frac{V_{IN}}{R_{SENSE}} \times \frac{R_{130}}{R_{128} + R_{130}}$$

tracks well with the input voltage $V_{IN}$, for a given inductance value L of the primary-side coil 114, the compensation factor $$\frac{V_{IN}}{R_{SENSE}} \times \frac{R_{130}}{R_{128} + R_{130}}$$

effectively cancels out delays in turning the switch 108 OFF.

However, secondary-side sensing requires additional, potentially relatively expensive components. Using primary-side sensing and applying the compensation factor $$\frac{V_{IN}}{R_{SENSE}} \times \frac{R_{130}}{R_{128} + R_{130}},$$

which equals $$\frac{V_{IN}}{L} \times t_{DELAY},$$

works for a particular inductance value L of the primary-side coil 114. However, the inductance value L of the primary-side coil 114 can vary from transformer to transformer by, for example, at least +/−10%. Thus, if the inductance value L used by the controller 106 differs from the actual inductance value L for the primary-side coil 114, then the estimation of the peak value of the primary-side current $i_{PRIMARY}$ can result in errors providing power to the load 104. Additionally, altering the primary-side current value across the sense resistor $R_{SENSE}$ prior to sensing a representative value of the primary-side current $i_{PRIMARY}$ utilizes external components, which increase the cost of the electronic system 100.

SUMMARY OF THE INVENTION

In one embodiment of the present invention, a method includes sensing a value of a current in a switching power converter during a switching cycle of the switching power converter. The method also includes detecting a target peak value of the current value and adjusting the detected target peak value of the current value with a post-detection delay compensation factor to generate a delay compensated current value. The method further includes determining an amount of current provided to a load coupled to the switching power converter based on the delay compensated current value and generating a switch control signal to control the value of the current in the switching power converter to provide energy to the load in accordance with the delay compensated current value.

In another embodiment of the present invention, an apparatus includes a controller a controller having an input to sense a value of a current in a switching power converter during a switching cycle of the switching power converter. The controller is capable to detect a target peak value of the current value and adjust the detected target peak value of the current value with a post-detection delay compensation factor to generate a delay compensated current value. The controller is further capable to determine an amount of current provided to a load coupled to the switching power converter based on the delay compensated current value and generate a switch control signal to control the value of the current in the switching power converter to provide energy to the load in accordance with the delay compensated current value.

In a further embodiment of the present invention, an apparatus includes a switching power converter, wherein the switching power converter includes a transformer having a primary-side and a secondary-side. The apparatus also includes a controller having an input to sense a value of a current in a switching power converter during a switching cycle of the switching power converter. The controller is capable to detect a target peak value of the current value and adjust the detected target peak value of the current value with a post-detection delay compensation factor to generate a delay compensated current value. The controller is further capable to determine an amount of current provided to a load coupled to the switching power converter based on the delay compensated current value and generate a switch control signal to control the value of the current in the switching power converter to provide energy to the load in accordance with the delay compensated current value. The apparatus further includes a load coupled to the secondary-side of the transformer of the switching power converter.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

An electronic system includes a controller to control a switching power converter to provide power to a load. To control the amount of power provided to the load, in at least one embodiment, the controller senses a current value representing a current in the switching power converter and detects when the current value reaches a target peak value. However, due to delays in the controller and/or the switching power converter, the detected target peak value will not be the actual current peak value generated by the switching power converter. In at least one embodiment, the controller adjusts the detected target peak value with a post-detection delay compensation factor to generate a delay compensated current value that more accurately represents an actual peak current value associated with the current in the switching power converter. In at least one embodiment, the controller utilizes the delay compensated current value to determine an amount of current provided to the load and to determine a subsequent target peak current value.

one embodiment, the post-detection delay compensation factor models an extrapolation of the value of the current that changes as a result of delays in the controller and/or the switching power converter. Exemplary delays occur between detecting the approximate peak value of the current value by the controller and discontinuing the current by the switching power converter. In at least one embodiment, the current value increases linearly as delay increases and, thus, is modeled using a linear extrapolation. However, the particular model is a matter of design choice and depends on the characteristic effects of delays on the current value. In at least one embodiment, the post-detection delay compensation factor represents a dynamically determined, approximate delay between the detected peak value of the current and an actual peak value of the current.

Figure 2:
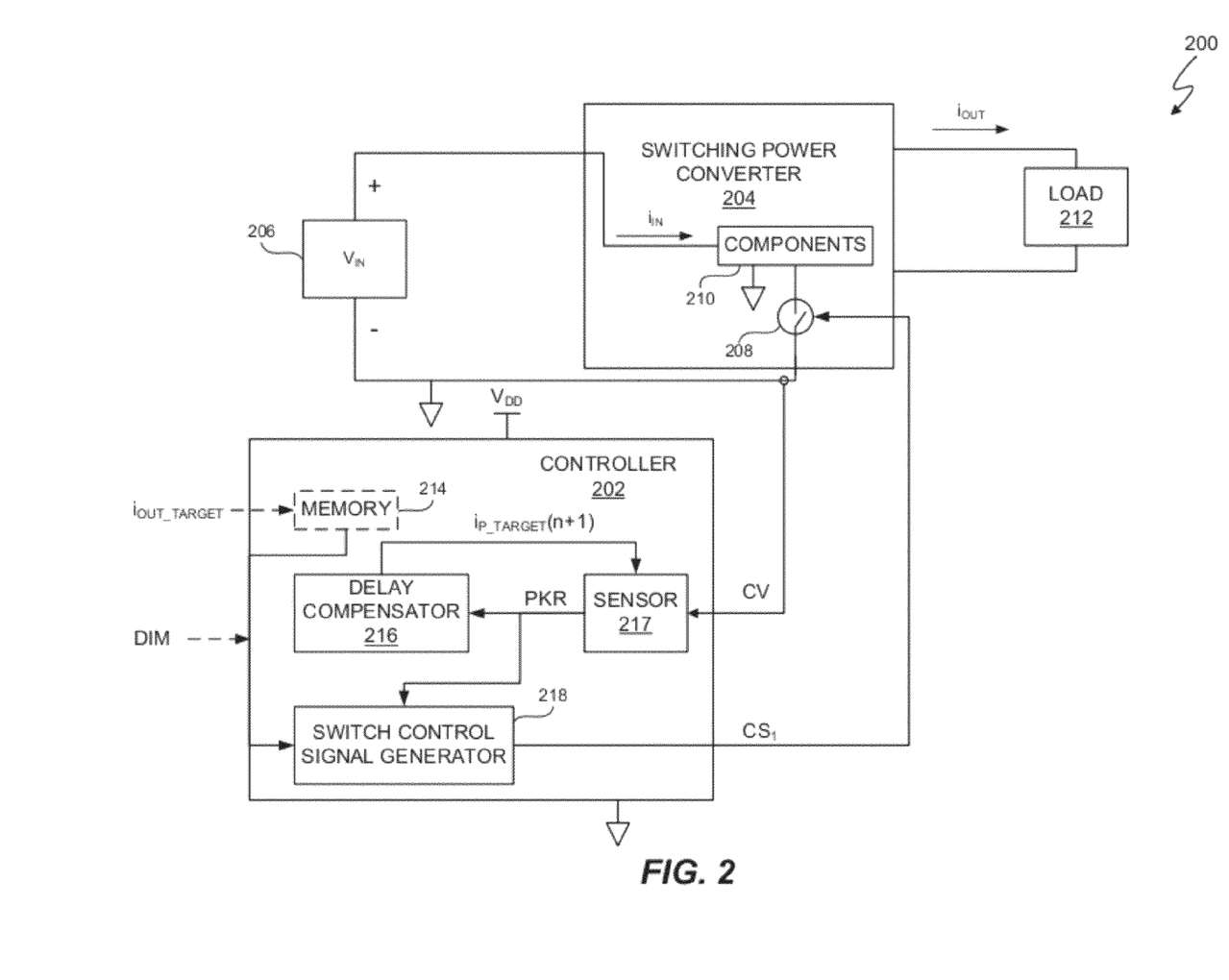
FIG. 2 depicts an electronic system that utilizes a delay compensated current value to control a switching power converter.

FIG. 2 depicts an electronic system 200 that includes a controller 202 to control switching power converter 204 using peak current control and a delay compensation factor. Voltage supply 206 supplies an input voltage $V_{IN}$ to the switching power converter 204. The voltage supply 206 can be any type of voltage supply and is, for example, the same as voltage supply 102 (FIG. 1). The controller 202 generates a switch control signal $CS_1$ that controls the conductivity of switch 208 and the flow of input current $i_{IN}$. Switch 208 can be any type of switch, such as a field effect transistor (FET). When the switch 208 conducts, the input current $i_{IN}$ flows into components 210 and through switch 208. The input current $i_{IN}$ may equal to a current entering the switching power converter 204 or may be less than the current entering the switching power converter 204. The switching power converter 204 uses the input current $i_{IN}$ and the input voltage $V_{IN}$ to generate a secondary-side voltage $V_S$ and an output current $i_{OUT}$ for the load 212. In at least one embodiment, the controller 202 regulates the output current $i_{OUT}$. The load 212 can be any type of load, such as one or more lamps, each having one or more light emitting diodes (LEDs).

In at least one embodiment, the controller 202 targets a particular output current $i_{OUT\_TARGET}$ to provide to the load 212. The target output current $i_{OUT\_TARGET}$ represents the amount of charge provided to the load 212 during a period of time. In at least one embodiment, the target output current $i_{OUT\_TARGET}$ is a target amount of charge provided to the load 212 over a cyclic period, (for example, "TT" in FIG. 5) of the switch control signal $CS_1$. The manner in which the controller 202 determines the amount of output current $i_{OUT\_TARGET}$ to target is a matter of design choice. In at least one embodiment, the targeted output current $i_{OUT\_TARGET}$ is entered as data into an optional memory 214. In at least one embodiment, the targeted output current $i_{OUT\_TARGET}$ indicates a single amount of current or a single amount of charge to be delivered within a period of time. In at least one embodiment, the targeted output current $i_{OUT\_TARGET}$ is entered as one time programmable data. In at least one embodiment, the targeted output current $i_{OUT\_TARGET}$ indicates multiple levels of current or multiple amounts of charge to be delivered within a period of time. In at least one embodiment, the multiple values correspond to multiple output settings for the load 212 such as different dimming level settings indicated by the DIM signal. In at least one embodiment, the controller 202 receives the DIM signal from a dimmer (not shown) or from another input source (not shown).

Figure 3:
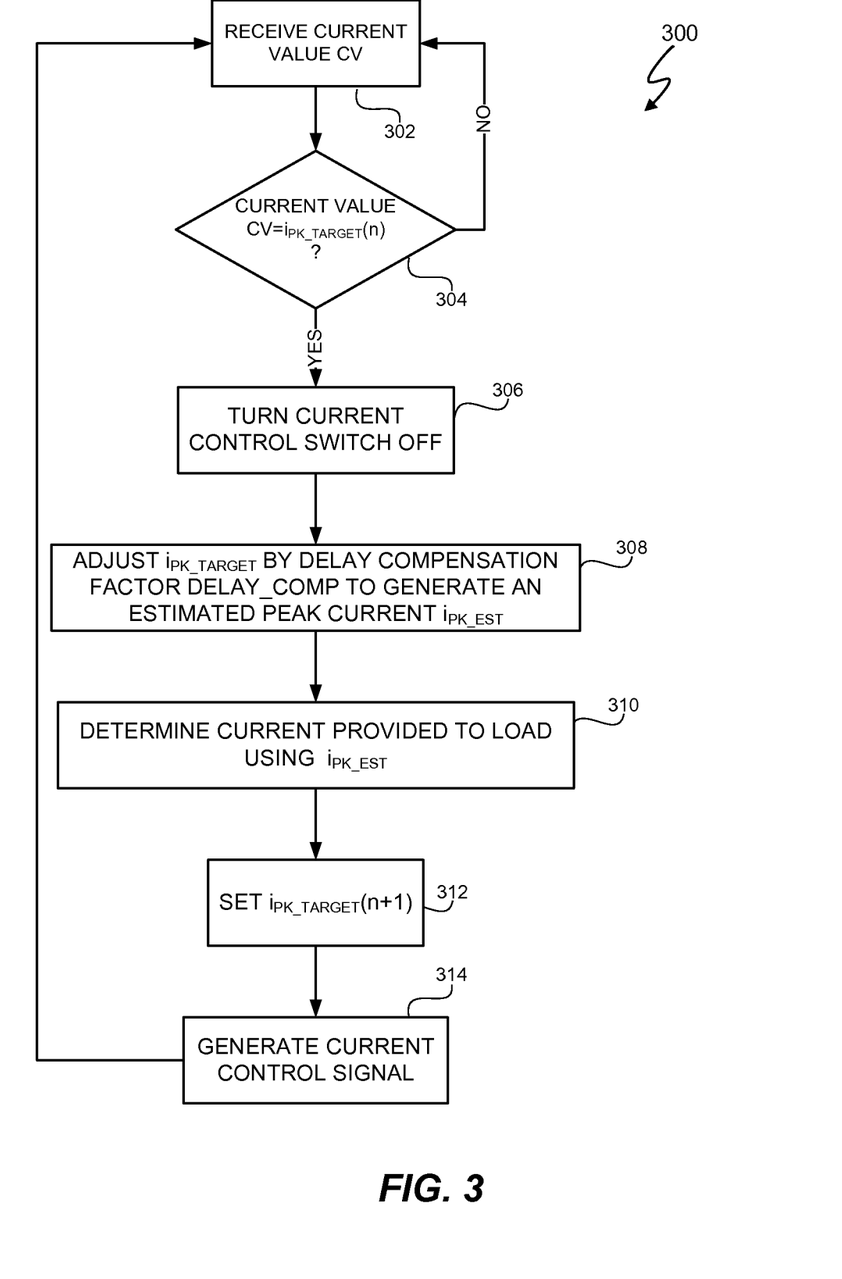
FIG. 3 depicts an exemplary control process for controlling the switching power converter of FIG. 2.

FIG. 3 depicts an exemplary control process 300 for controlling the switching power converter using a delay compensation factor. Referring to FIGS. 2 and 3, the controller 202 includes a sensor 217 that receives the current value CV in operation 302. The current value CV represents a value of the input current $i_{IN}$ flowing through the switch 208. The current value CV can represent the input current $i_{IN}$ in any manner, such as a scaled or unscaled current or voltage. In operation 304, the sensor 217 compares the received current value CV with a then-current target peak current value $i_{PK\_TARGET}(n)$ for the input current $i_{IN}$ to detect when the current value CV equals the target peak current value $i_{PK\_TARGET}(n)$. "(n)" is an index reference. If the current value CV does not equal the target peak current value $i_{PK\_TARGET}(n)$, operations 302 and then 304 repeat. When the current value CV equals the target peak current value $i_{PK\_TARGET}(n)$, the sensor 217 sends a "peak reached signal" PKR to the switch control signal generator 218 indicating that the switch control signal generator 218 should turn the switch 208 OFF. In operation 306, the switch control signal generator 218 responds by generating the control signal $CS_1$ to turn the switch 208 OFF. In at least one embodiment, the control signal $CS_1$ is a pulse width modulated signal.

Delays occur between the time the sensor 217 detects that the current value equals the target peak current value $i_{PK\_TARGET}$ and when the switch 208 turns OFF. The delays can arise from any number of sources such as:

Delay in operation 304 determining whether the current value CV equals the $i_{PTARGET}(n)$;

Delay in propagating the control signal $CS_1$ to the switch 208; and

Delay in the response of switch 208 to the control signal $CS_1$ to turn the switch 208 OFF.

During the delays, the input current $i_{IN}$ continues to increase. Thus, the delays result in the switching power converter 204 providing an additional amount of current $i_{OUT}$ to the load 212 after the sensor 217 detects that the current value CV has reached the target peak current value $i_{PK\_TARGET}(n)$. The sensor 217 also provides the peak reached signal PKR to the delay compensator 216. To compensate for the delays, in operation 308, the delay compensator 216 receives the peak reached signal PKR and adjusts the detected target peak current value $i_{PK\_TARGET}(n)$ with a delay compensation factor DELAY_COMP to generate an estimated peak current $i_{PK\_EST}$. In at least one embodiment, the adjustment of the target peak current value $i_{PK\_TARGET}(n)$ by the delay compensation factor DELAY_COMP models the increase in the input current $i_{IN}$ that occurs due to the delays. The particular model depends on the characteristics of the input current $i_{IN}$ and a desired degree of accuracy in estimating the actual peak value of the input current $i_{IN}$. In at least one embodiment, the input current $i_{IN}$ increases linearly over time, and the adjustment of the target peak current value $i_{PK\_TARGET}(n)$ by the delay compensation factor DELAY_COMP represents a linear extrapolation of the input current $i_{IN}$ that occurs during the delays.

Once the delay compensator 216 determines the estimated peak current $i_{PK\_EST}$, and, based on the estimated peak current $i_{PK\_EST}$, operation 310 determines the amount of output current $i_{OUT}$ provided to the load 212. In at least one embodiment, the particular quantification of the value of the output current $i_{OUT}$ provided to the load 212 is a matter of design choice. In at least one embodiment, operation 310 quantifies the current $i_{OUT}$ provided to the load 212 as an amount of charge provided to the load 212 during a period TT of the control signal $CS_1$.

Operation 312 sets the next target peak current value $i_{PK\_TARGET}(n+1)$ to minimize a difference between the amount of estimated actual output current $i_{OUT}$ provided to the load 212 and the target output current $i_{OUT\_TARGET}$. In at least one embodiment, operation 312 sets the value of the target peak current value $i_{PK\_TARGET}(n+1)$ by responding to any difference between the output current $i_{OUT}$ provided to the load 212, as determined using estimated peak current $i_{PK\_EST}$, and the target output current $i_{OUT\_TARGET}$ for provision to the load 212. If the estimated actual output current $i_{OUT}$ is greater than the target output current $i_{OUT\_TARGET}$, then operation 312 reduces the value of the target peak current value $i_{PK\_TARGET}(n+1)$. If the estimated actual output current $i_{OUT}$ is less than the target output current $i_{OUT\_TARGET}$, then operation 312 increases the value of the target peak current value $i_{PK\_TARGET}(n+1)$. In at least one embodiment, operation 312 adjusts the target peak current value $i_{PK\_TARGET}(n+1)$ every cycle of the control signal $CS_1$ to minimize the difference between the estimated output current $i_{OUT}$ provided to the load 212 and the target output current $i_{OUT\_TARGET}$. The particular convergence algorithm used to select the values of each subsequent target peak current value $i_{PK\_TARGET}(n+1)$ so that the output current $i_{OUT}$ converges to the target output current $i_{OUT\_TARGET}$ is a matter of design choice and can be any custom or well-known convergence algorithm. The delay compensator 216 provides the target peak current value $i_{PK\_TARGET}(n+1)$ to the sensor 217. The target peak current value $i_{PK\_TARGET}(n+1)$ then becomes the current target peak current value $i_{PTARGET}(n)$ for the next cycle of control process 300.

In operation 314, the switch control signal generator 218 generates the switch control signal $CS_1$ to turn the switch 208 ON. The particular time at which the switch control signal generator 218 turns the switch 208 ON is a matter of design choice and, in at least one embodiment, depends on the operational mode of the switching power converter 204. In at least one embodiment, the switching power converter 204 operates in quasi-resonant mode and/or discontinuous conduction mode as described, for example, in U.S. patent application Ser. No. 13/486,625, filed Jun. 1, 2012, entitled "Control Data Determination From Primary-Side Sensing of a Secondary-Side Voltage in a Switching Power Converter", assignee Cirrus Logic, Inc., and inventors Robert T. Grisamore and Zhaohui He, which is hereby incorporated by reference in its entirety (referred to herein as "Grisamore-He").

Figure 4:
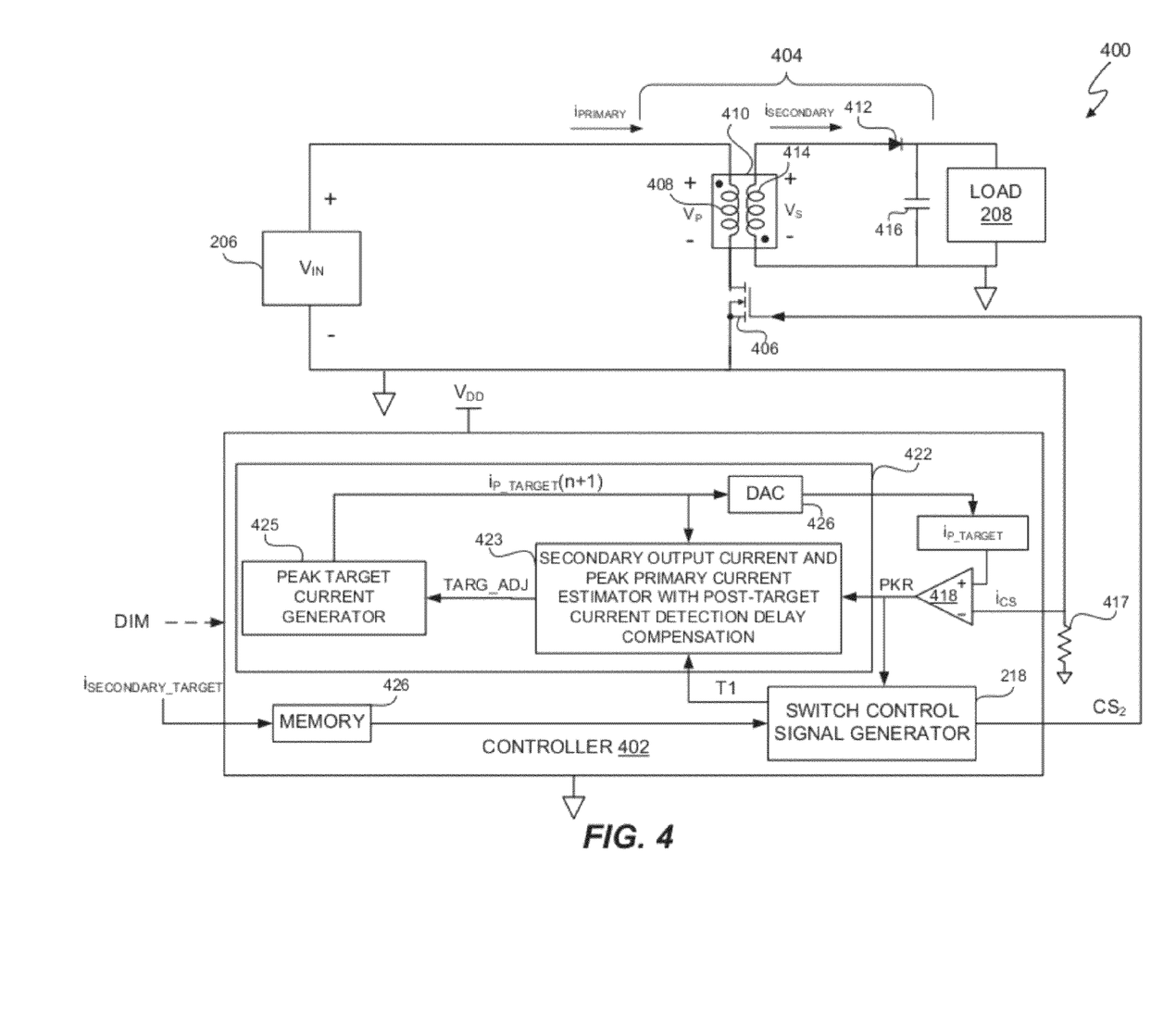
FIG. 4 depicts an electronic system representing one embodiment of the electronic system of FIG. 2.
Figure 5:
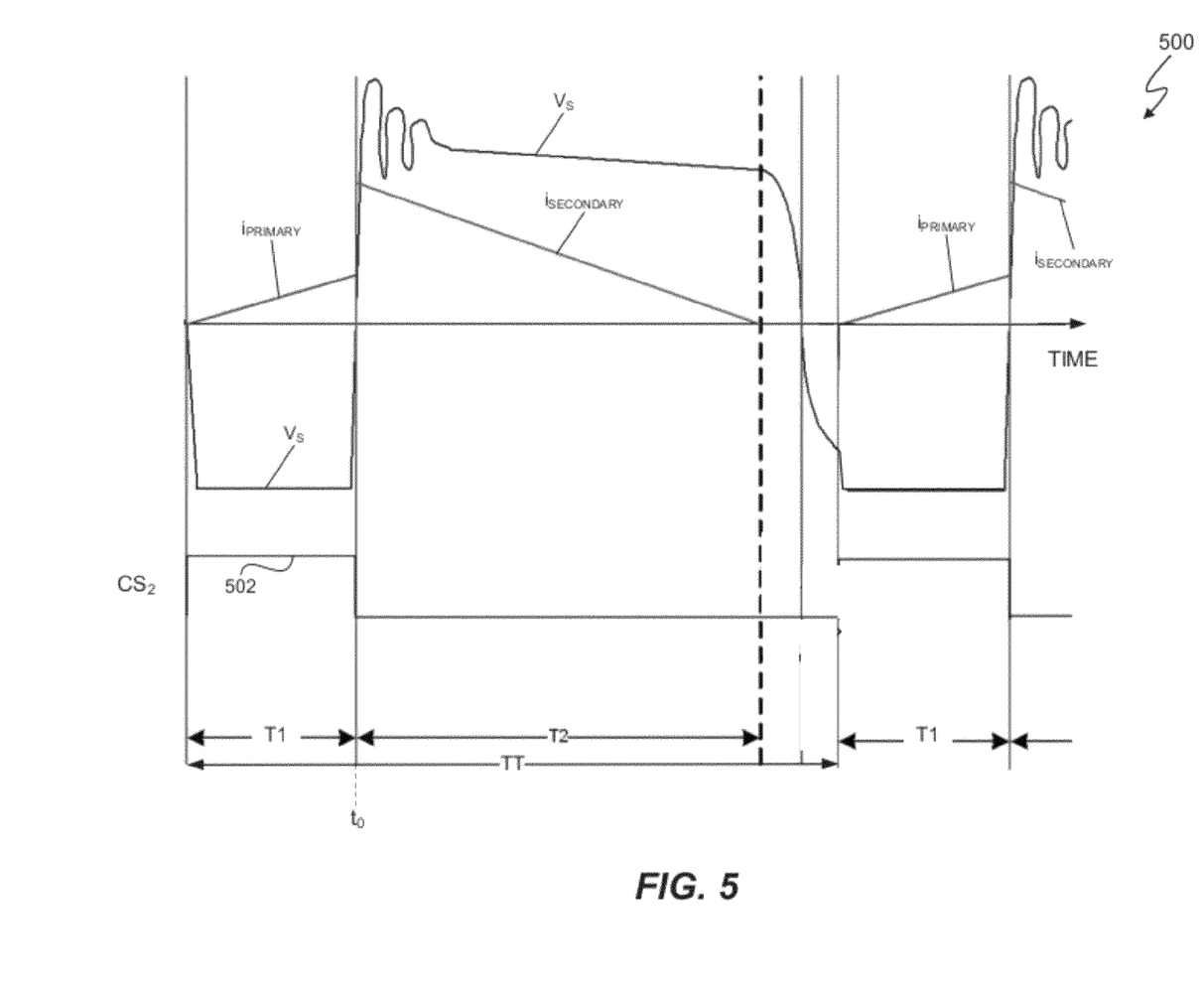
FIG. 5 depicts exemplary waveforms associated with the operation of the electronic system of FIG. 4.

FIG. 4 depicts an electronic system 400, which represents one embodiment of the electronic system 200. FIG. 5 depicts exemplary operational waveforms 500 for the electronic system 400. Referring to FIGS. 4 and 5, electronic system 400 includes a controller 402 that generates a control signal $CS_2$ to control a flyback-type switching power converter 404. The switch control signal generator 218 generates a pulse width modulated, current switch control signal $CS_2$ to control the conductivity of an n-channel metal oxide semiconductor field effect transistor (NMOSFET) switch 406, which represents one embodiment of switch 208. During a pulse, such as pulse 502, of the control signal $CS_2$, the primary-side current $i_{PRIMARY}$ linearly increases through the primary-side coil 408 of transformer 410 and develops a primary-side voltage $V_P$ across the primary-side coil 408. The primary-side voltage $V_P$ induces a secondary voltage $V_S$ across the secondary-side coil 414. Because of the dot configuration of the transformer 410, the secondary voltage $V_S$ is inverted from the primary-side voltage $V_P$ and reverse biases a diode 412 during each pulse of the control signal $CS_2$. While the diode 412 is reverse biased, capacitor 416 provides current to the load 208.

In at least one embodiment, the electronic system 400 operates in accordance with an embodiment of the exemplary control process 300. During the pulse 502, the primary-side current $i_{PRIMARY}$ flows through the switch 406 and develops a voltage across sense resistor 417. In operation 302, the comparator 418 receives the current sense signal $i_{CS}$, which represents one embodiment of the current value CV in FIGS. 2 and 3, and compares the current sense signal $i_{CS}$ with the then-current target peak current value $i_{PK\_TARGET}(n)$ value in operation 304. The peak reached signal PKR is a logical 1 until the current sense signal $i_{CS}$ reaches the target peak current value $i_{PTARGET}$, then the peak reached signal PKR transitions to a logical 0. The comparator 418 provides the logical zero value of the peak reached signal PKR to the switch control signal generator 218 and delay compensator 422. In operation 306, the switch signal control generator 218 causes the switch control signal $CS_2$ to transition to a logical 0 at time $t_0$, which turns the FET 406 OFF. The duration of the pulse 502 of switch control signal $CS_2$ is referred to as T1.

The delay compensator 422 conceptually includes two functional units, the secondary output current and peak primary current estimator with post-target current detection delay compensation 423 (referred to as the "currents estimator 423") and the peak target current generator 425. In operation 308, the currents estimator 423 adjusts the target peak current value $i_{PK\_TARGET}(n)$ by a delay compensation factor DELAY_COMP to generate an estimated peak current $i_{PK\_EST}$ in order to determine the amount of secondary-side current $i_{SECONDARY}$ delivered to the load 208. As previously discussed, various delays occur between the time when the comparator 418 detects that the current sense signal $i_{CS}$ reaches the target peak current value $i_{PK\_TARGET}(n)$ and when the FET 406 stops conducting the primary-side current $i_{PRIMARY}$.

Figure 6:
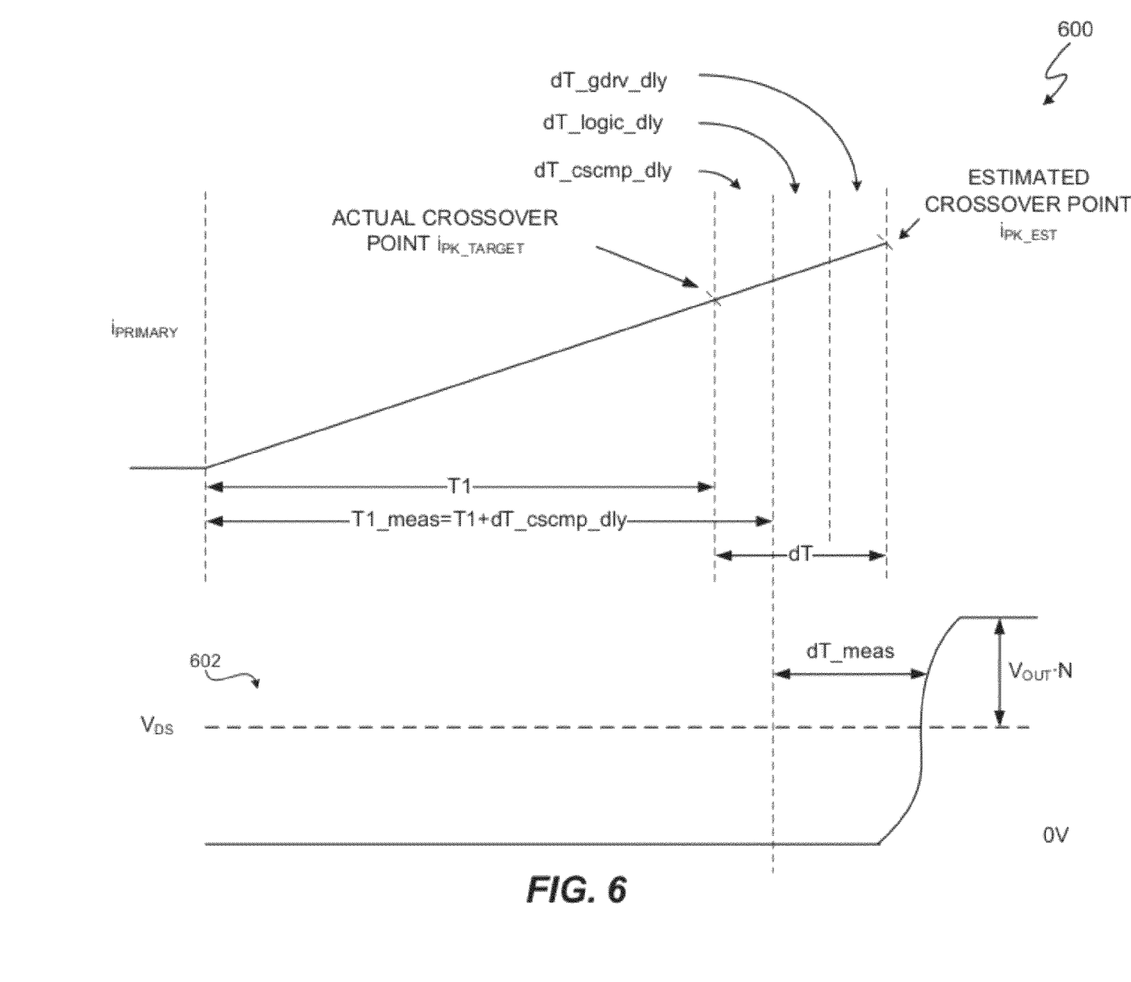
FIG. 6 depicts an exemplary primary-side current and delay effects graph.

FIG. 6 depicts an exemplary primary-side current $i_{PRIMARY}$ and delay effects graph 600. Referring to FIGS. 4, 5, and 6, one of the delays is the delay by the comparator 418 in comparing the current sense voltage $V_{CS}$ with the target peak current value $i_{PK\_TARGET}(n)$. With finite gain and bandwidth, the current sense comparator 418 incurs a detection delay dT_cscmp_dly between when the comparator 418 actually detects that the current sense voltage $V_{CS}$ equals the target peak current value $i_{PTARGET}(n)$, as indicated by the "ACTUAL CROSSOVER POINT $i_{PK\_TARGET}$", when the comparator 418 transitions the state of the peak reached signal PKR. During the detection delay dT_cscmp_dly, the primary-side current $i_{PRIMARY}$ continues to linearly increase. In at least one embodiment, Equation [3] represents change in the peak value $\Delta i_{PK}$ of the primary-side current $i_{PRIMARY}$ due to the detection delay dT_cscmp_dly:

$$\Delta i_{PK} = \frac{V_{IN}}{L} \times dT\_cscmp\_dly. \quad \text{Equation [3]}$$

$V_{IN}$ is the input voltage, L is the inductance value of the primary-side coil 408, and a dT_cscmp_dly is the detection delay between when the comparator 418 actually detects that the current sense voltage $V_{CS}$ equals the target peak current value $i_{PTARGET}(n)$.

A further delay is a propagation delay dT_logic_dly from an output of the comparator 418 to the transition of the control signal CS$_2$ at the gate of the FET 406. The propagation delay dT_logic_dly is due to, for example, delays in inverters, flip-flops, level shifters, etc., which allow the primary-side current to continue to linearly increase. In at least one embodiment, Equation [4] represents change in the peak value $\Delta i_{PK}$ of the primary-side current $i_{PRIMARY}$ due to the propagation delay dT_logic_dly:

$$\Delta i_{PK} = \frac{V_{IN}}{L} \times dT\_logic\_dly. \quad \text{Equation [4]}$$

$V_{IN}$ is the input voltage, L is the inductance value of the primary-side coil 408, and a dT_logic_dly is the propagation delay from an output of the comparator 418 to the transition of the control signal CS$_2$ at the gate of the FET 406.

Another delay is the delay in turning OFF the FET 406. Turning the FET 406 involves, for example, removing charge from the gate of the FET 406 and depleting charge in the conducting channel of the FET 406. In at least one embodiment, Equation [5] represents change in the peak value $\Delta i_{PK}$ of the primary-side current $i_{PRIMARY}$ due to the turn OFF delay of FET 406:

$$\Delta i_{PK} = \frac{V_{IN}}{L} \times dT\_gdrv\_dly. \quad \text{Equation [5]}$$

$V_{IN}$ is the input voltage, L is the inductance value of the primary-side coil 408, and a dT_gdrv_dly is the delay in turning the FET 406 OFF.

By summing Equations [3], [4], [5], Equation [6] represents the estimated peak current $i_{PK\_EST}$ of the primary-side current $i_{PRIMARY}$.

$$i_{PK\_EST} = \frac{V_{IN}}{L} \times (T1\_\text{meas} + \quad \text{Equation [6]}$$
$$dT\_cscmp\_dly + dT\_logic\_dly + dT\_gdrv\_dly),$$

which rearranges to:

$$i_{PK\_EST} = i_{PK\_TARGET} \times \left(1 + \frac{dT\_dly\_total}{T1\_\text{meas}}\right).$$

dT_dly_total=dT_cscmp_dly+dT_logic_dly+dT_gdrv_dly is the estimated delay duration of the primary-side current $i_{PRIMARY}$ during a cycle of the control signal CS$_2$. The quantity $$\left(1 + \frac{dT\_dly\_total}{T1\_\text{meas}}\right)$$

represents an embodiment of a delay compensation factor DELAY_COMP. T1_meas is a measured value of T1 since the actual value of T1 is unknown. The measured value also incurs a delay error. However, dT_dly_total is much smaller than the actual T1, so the delay due to measuring T1 is not included in the delay compensation factor. In at least one embodiment, the value of the delay compensation factor DELAY_COMP equal to $$\left(1 + \frac{dT\_dly\_total}{T1\_\text{meas}}\right)$$

is empirically or analytically predetermined based on knowledge of the components used on the electronic system 400 and is stored in the memory 424. The delay compensation factor DELAY_COMP is used by the currents estimator 423 to determine the estimated peak current $i_{PK\_EST}$ after detection of the target peak value of the primary-side current. In at least one embodiment, this "post-detection" delay compensation factor DELAY_COMP reduces external components and is flexible to represent multiple delay types. Additionally, in at least one embodiment, the delay compensation factor DELAY_COMP is not sensitive to variations in inductance values of the primary-side coil 408.

In at least one other embodiment, the value of the delay compensation factor DELAY_COMP is measured as dT_meas by measuring changes in the drain to source $V_{DS}$ voltage of FET 406 as shown in waveform 602. However, this measurement also incurs a delay that is, in at least one embodiment, accounted for by adding dT_cscmp_dly to dT_meas.

In operation 310, in accordance with Equation [7], the currents estimator 423 uses the estimated peak current $i_{PK\_EST}$ of Equation [6] to determine the secondary current $i_{SECONDARY}$ delivered to the load 208 during the period TT of the control signal CS$_2$. The area beneath the secondary-side current $i_{SECONDARY}$ represents the amount of charge delivered to the load 208. Equation [7] represents the amount of charge provided to the load 208 during the period TT of the control signal CS$_2$;

$$i_{SECONDARY} = \frac{Q}{TT} = \frac{1}{2} \times \frac{i_{PK\_EST} \times T2}{TT}. \qquad \text{Equation [7]}$$

Q is the charge provided to the load 208, TT is the period of the control signal $CS_2$, $i_{PK\_EST}$ is the estimated peak value of the primary-side current $i_{PRIMARY}$ as adjusted by the delay compensation factor DELAY_COMP, and T2 is the duration of the secondary-side current $i_{SECONDARY}$ from the end of the period T1 until the secondary-side current $i_{SECONDARY}$ decays to zero. Grisamore-He describes an exemplary system and method to determine the values of T2 and TT.

The currents estimator 423 provides a peak primary-side current target adjustment signal TARG_ADJ to the peak target current generator 425. In operation 312, the delay compensator 422 sets the next value of the target peak current value $i_{PTARGET}(n+1)$ based on how the amount of secondary-side current $i_{SECONDARY}$ provided to the load 208 as determined by Equation [7] compares to the targeted amount of secondary-side current $i_{SECONDARY\_TARGET}$. The peak target current generator 425 increases the target peak current value $i_{PK\_TARGET}(n+1)$ if the comparison indicates a desired increase in the amount of energy provided to load 208 and decreases the target peak current value $i_{PK\_TARGET}(n+1)$ if the comparison indicates a desired decrease in the amount of current provided to the load 208. The peak target current generator 425 provides the next target peak current value $i_{PK\_TARGET}(n+1)$ to a digital-to-analog converter 426 to provide an analog version of the target peak current value $i_{PK\_TARGET}(n+1)$ to the comparator 418 for the next cycle of process 300. Thus, the target peak current value $i_{PK\_TARGET}(n+1)$ then becomes the current target peak current value $i_{PK\_TARGET}$ for use by the comparator 418. The peak target current generator 425 also provides the next target peak current value $i_{PK\_TARGET}(n-1)$ to the currents estimator 423 for use in conjunction with Equation [6].

Figure 7:
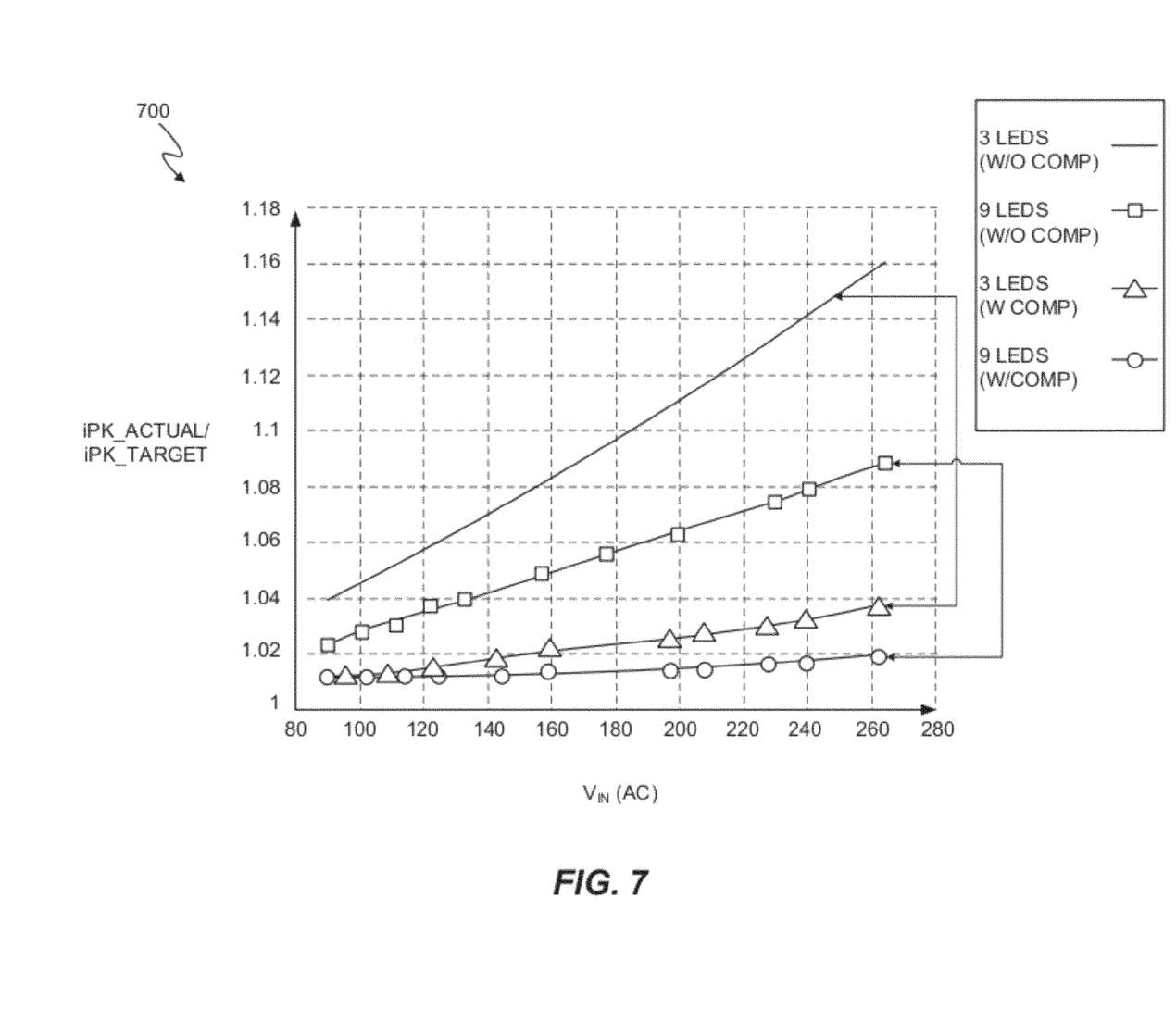
FIG. 7 depicts an exemplary comparison between delay compensated and uncompensated ratios of actual to target peak primary-side currents.

FIG. 7 depicts an exemplary delay compensated and uncompensated comparison graph 700 using a ratio of the actual primary-side peak current "iPK_ACTUAL" to a peak primary-side current "iPK_TARGET" to determine the current provided to the load 208 having 9 LEDs and 3 LEDs. For the compensated primary-side peak current, iPK_TARGET represents the estimated peak current $i_{PK\_EST}$. Because graph 700 depicts a ratio, the ideal value is 1 with less ideal values varying further from 1. The delay compensator 422, utilizing a post-detection delay compensation factor DELAY_COMP and the post-detection delay compensated estimated peak current $i_{PK\_EST}$ clearly results in a closer estimate of the peak value of the primary-side current $i_{PRIMARY}$. Having a close estimate can be particularly important in certain embodiments of the electronic system 300 such as in a multiple color, multiple LED lamp load 208 when precise provision of energy to the LEDs has a noticeable effect on the color of light produced by this embodiment of the load 208.

Figure 8:
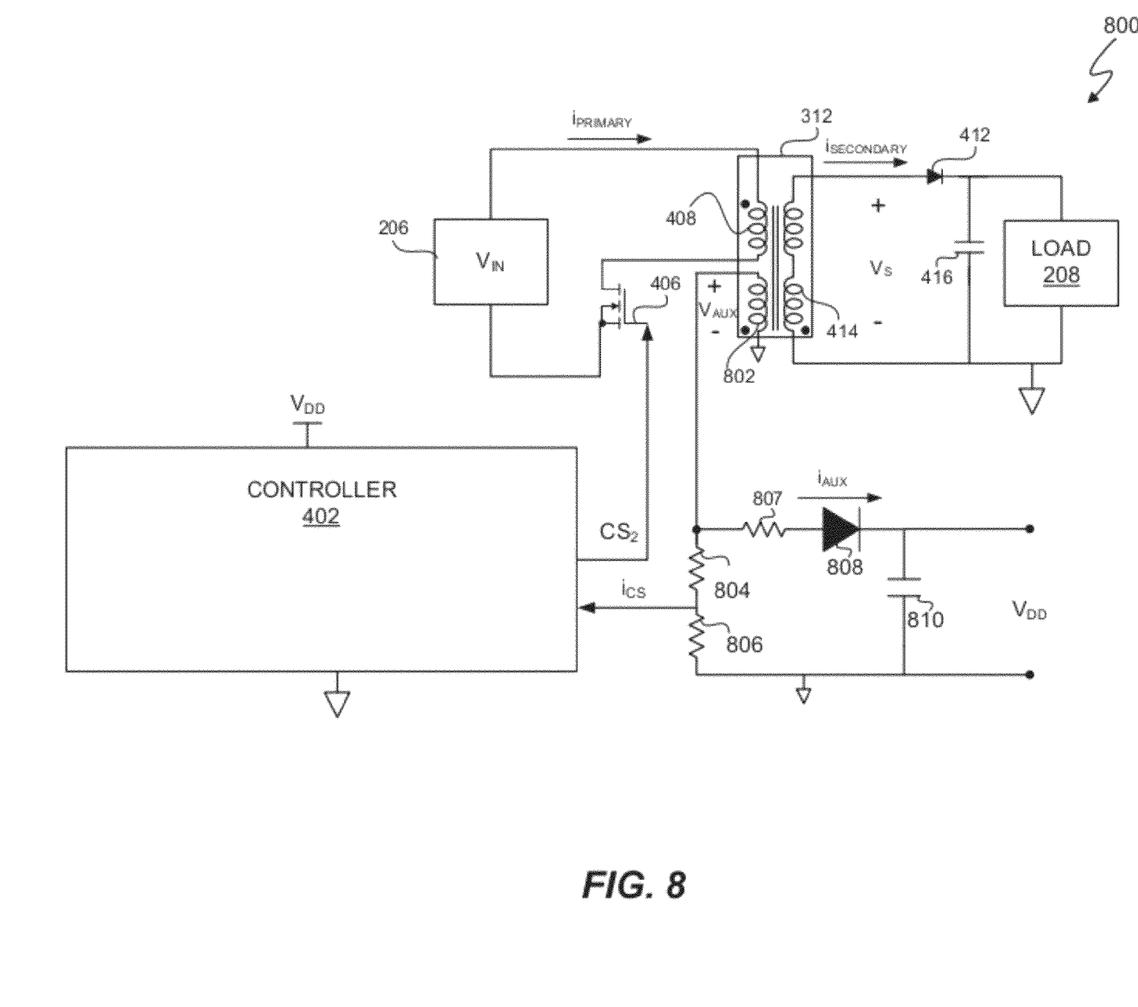
FIG. 8 depicts an alternative embodiment of obtaining a current sense signal using a primary-side auxiliary winding.

FIG. 8 depicts an electronic system 800, which represents another embodiment of the electronic system 300. The method of sampling the primary-side current $i_{PRIMARY}$ is a matter of design choice. The electronic system 800 utilizes an auxiliary winding 802 to generate an auxiliary voltage $V_{AUX}$ that is proportional to the secondary-side voltage $V_S$. Resistors 804 and 806 form a voltage divider to generate the current sense signal $i_{CS}$. The auxiliary current $i_{AUX}$ flows through resistor 807 and diode 808 when the diode 808 is forward biased and charges capacitor 810 to generate the $V_{DD}$ operating voltage for the controller 402.

Thus, an electronic system includes controller to control a switching power converter to provide power to a load. In at least one embodiment, the controller adjusts a detected target peak value with a post-detection delay compensation factor to generate a delay compensated current value that more accurately represents an actual peak current value associated with the current in the switching power converter. In at least one embodiment, the controller utilizes the delay compensated current value to determine an amount of current provided to the load and to determine a subsequent target peak current value.

Although embodiments have been described in detail, it should be understood that various changes, substitutions, and alterations can be made hereto without departing from the spirit and scope of the invention as defined by the appended claims.

What is claimed is:

1. A method comprising: (a) sensing a value of a current in a switching power converter during a switching cycle of the switching power converter; (b) detecting a target peak value of the current value; (c) adjusting the detected target peak value of the current value with a post-detection delay compensation factor to generate a delay compensated current value; (d) determining an amount of current provided to a load coupled to the switching power converter based on the delay compensated current value; and (e) generating a switch control signal to control the value of the current in the switching power converter to provide energy to the load in accordance with the delay compensated current value.

2. The method of claim 1 further comprising:
if the amount of energy delivered to the load is not an amount of energy to meet power requirements of the load, adjusting the target peak value to allow the switching power converter to meet the amount of energy to meet the power requirements of the load; and
repeating (a)-(e).

3. The method of claim 2 further comprising:
determining the power requirements of the load from a member of a group consisting of:
programmable load power requirement data, nonprogrammable load power requirement data, and a dimming signal.

4. The method of claim 1 wherein determining an amount of current provided to a load comprises determining an amount of average charge delivered to the load during a period of the switch control signal.

5. The method of claim 1 wherein the switching power converter comprises a flyback-type switching power converter that includes a transformer having (i) a primary-side that conducts a primary-side current and (ii) a secondary-side, and sensing a value of a current in a switching power converter during a switching cycle of the switching power converter comprises:
sensing a value of the primary-side current in the switching power converter during a switching cycle of the switching power converter.

6. The method of claim 1 wherein the switching power converter comprises a flyback-type switching power converter that includes a transformer having a primary-side coil having an inductance value, and the post-detection, delay compensation factor is independent of the inductance value of the primary-side coil.

7. The method of claim 1 wherein adjusting the approximate peak value of the current value with a post-detection, delay compensation factor to generate a delay compensated current value comprises:

adjusting the approximate peak value of the current value with a post-detection, delay compensation factor that models an extrapolation of the value of the current that changes as a result of delays between detecting the approximately peak value of the current value and discontinuing the current.

8. The method of claim 1 further comprising:
dynamically determining an approximate delay between the detected peak value of the current and an actual peak value of the current.

9. The method of claim 1 wherein the post-detection, delay compensation factor represents delays from multiple stages in the controller between detecting the approximate peak value of the current value and discontinuing the current.

10. The method of claim 1 wherein the load comprises one or more lamps, each having one or more light emitting diodes.

11. An apparatus comprising: a controller having an input to sense a value of a current in a switching power converter during a switching cycle of the switching power converter, wherein the controller is capable to: (a) detect a target peak value of the current value; (b) adjust the detected target peak value of the current value with a post-detection delay compensation factor to generate a delay compensated current value; (c) determine an amount of current provided to a load coupled to the switching power converter based on the delay compensated current value; and (d) generate a switch control signal to control the value of the current in the switching power converter to provide energy to the load in accordance with the delay compensated current value.

12. The apparatus of claim 11 wherein the controller is further capable to:
if the amount of energy delivered to the load is not an amount of energy to meet power requirements of the load, adjust the target peak value to allow the switching power converter to meet the amount of energy to meet the power requirements of the load; and
repeating (a)-(d).

13. The apparatus of claim 12 wherein the controller is further capable to:
determine the power requirements of the load from a member of a group consisting of:
programmable load power requirement data, nonprogrammable load power requirement data, and a dimming signal.

14. The apparatus of claim 11 wherein to determine an amount of current provided to a load, the controller is further capable to comprises determine an amount of average charge delivered to the load during a period of the switch control signal.

15. The apparatus of claim 11 wherein the switching power converter comprises a flyback-type switching power converter that includes a transformer having (i) a primary-side that conducts a primary-side current and (ii) a secondary-side, and to sense a value of a current in a switching power converter during a switching cycle of the switching power converter the controller is further capable to:
sense a value of the primary-side current in the switching power converter during a switching cycle of the switching power converter.

16. The apparatus of claim 11 wherein the switching power converter comprises a flyback-type switching power converter that includes a transformer having a primary-side coil having an inductance value, and the post-detection, delay compensation factor is independent of the inductance value of the primary-side coil.

17. The apparatus of claim 11 wherein to adjust the approximate peak value of the current value with a post-detection, delay compensation factor to generate a delay compensated current value the controller is further capable to:
adjust the approximate peak value of the current value with a post-detection, delay compensation factor that models an extrapolation of the value of the current that changes as a result of delays between detecting the approximately peak value of the current value and discontinuing the current.

18. The apparatus of claim 11 wherein the controller is further capable to:
dynamically determine an approximate delay between the detected peak value of the current and an actual peak value of the current.

19. The apparatus of claim 11 wherein the post-detection, delay compensation factor represents delays from multiple stages in the controller between detecting the approximate peak value of the current value and discontinuing the current.

20. The apparatus of claim 11 wherein the load comprises one or more lamps, each having one or more light emitting diodes.

21. An apparatus comprising: a switching power converter, wherein the switching power converter includes a transformer having a primary-side and a secondary-side; a controller having an input to sense a value of a current in the switching power converter during a switching cycle of the switching power converter, wherein the controller is capable to: (a) detect a target peak value of the current value; (b) adjust the detected target peak value of the current value with a post-detection delay compensation factor to generate a delay compensated current value; (c) determine an amount of current provided to a load coupled to the switching power converter based on the delay compensated current value; and (d) generate a switch control signal to control the value of the current in the switching power converter to provide energy to the load in accordance with the delay compensated current value; and a load coupled to the secondary-side of the transformer of the switching power converter.

22. The apparatus of claim 21 wherein the load comprises one or more lamps, each having one or more light emitting diodes.

* * * * *